(12) United States Patent
O'Toole et al.

(10) Patent No.: US 12,166,200 B2
(45) Date of Patent: Dec. 10, 2024

(54) PATTERNED ANODES FOR LITHIUM-BASED ENERGY STORAGE DEVICES

(71) Applicant: Graphenix Development, Inc., Williamsville, NY (US)

(72) Inventors: Terrence R. O'Toole, Webster, NY (US); John C. Brewer, Rochester, NY (US); Paul D. Garman, Pittsford, NY (US); Robert G. Anstey, Tonawanda, NY (US)

(73) Assignee: Graphenix Development, Inc., Williamsville, NY (US)

( * ) Notice: Subject to any disclaimer, the term of this patent is extended or adjusted under 35 U.S.C. 154(b) by 106 days.

(21) Appl. No.: 17/975,196

(22) Filed: Oct. 27, 2022

(65) Prior Publication Data

US 2023/0050827 A1 Feb. 16, 2023

Related U.S. Application Data

(63) Continuation of application No. 17/237,217, filed on Apr. 22, 2021, now Pat. No. 11,489,155, which is a
(Continued)

(51) Int. Cl.
*H01M 4/36* (2006.01)
*H01G 11/26* (2013.01)
(Continued)

(52) U.S. Cl.
CPC ............ *H01M 4/366* (2013.01); *H01G 11/26* (2013.01); *H01G 11/36* (2013.01); *H01G 11/68* (2013.01);
(Continued)

(58) Field of Classification Search
CPC ...... H01M 4/366; H01M 4/134; H01M 4/386; H01M 4/58; H01M 4/661; H01M 4/667;
(Continued)

(56) References Cited

U.S. PATENT DOCUMENTS 6,761,744 B1 7/2004 Tsukamoto et al.
7,378,041 B2 5/2008 Asao et al.
(Continued)

FOREIGN PATENT DOCUMENTS

WO 2013012334 A1 1/2013
WO 2015175509 A1 11/2015
(Continued)

OTHER PUBLICATIONS

Beattie, et al., "Understanding Capacity Fade in Silicon Based Electrodes for Lithium-Ion Batteries Using Three Electrode Cells and Upper Cut-off Voltage Studies", Science Direct, Journal of Power Sources, vol. 302, Jan. 2016, pp. 426-430.
(Continued)

*Primary Examiner* — Stewart A Fraser
(74) *Attorney, Agent, or Firm* — Polsinelli LLP; David D. Hsu

(57) ABSTRACT

A lithium-ion battery may include a cathode, an anode, and a polymer electrolyte. The anode may include a current collector. The current collector may include a metal oxide layer provided in a first pattern overlaying a metal layer. The anode may also include a patterned lithium storage structure. The patterned lithium storage structure may include a continuous porous lithium storage layer overlaying at least a portion of the first pattern of metal oxide. These and other lithium-ion batteries are described.

20 Claims, 20 Drawing Sheets

Related U.S. Application Data continuation of application No. 16/909,008, filed on Jun. 23, 2020, now Pat. No. 11,024,842.

(60) Provisional application No. 62/867,513, filed on Jun. 27, 2019.

(51) Int. Cl.
| | |
|---|---|
| *H01G 11/36* | (2013.01) |
| *H01G 11/68* | (2013.01) |
| *H01G 11/70* | (2013.01) |
| *H01M 4/04* | (2006.01) |
| *H01M 4/134* | (2010.01) |
| *H01M 4/38* | (2006.01) |
| *H01M 4/58* | (2010.01) |
| *H01M 4/66* | (2006.01) |
| *H01M 10/0525* | (2010.01) |
| *H01M 4/02* | (2006.01) |

(52) U.S. Cl.
CPC .......... *H01G 11/70* (2013.01); *H01M 4/0428* (2013.01); *H01M 4/134* (2013.01); *H01M 4/386* (2013.01); *H01M 4/58* (2013.01); *H01M 4/661* (2013.01); *H01M 4/664* (2013.01); *H01M 4/667* (2013.01); *H01M 10/0525* (2013.01); *H01M 2004/025* (2013.01); *H01M 2004/027* (2013.01)

(58) Field of Classification Search
CPC ........ H01M 10/0525; H01M 2004/027; H01G 11/26
See application file for complete search history.

(56) References Cited

U.S. PATENT DOCUMENTS

| | | | |
|---|---|---|---|
| 7,767,341 | B2 | 8/2010 | Kogetsu et al. |
| 8,257,866 | B2 | 9/2012 | Loveness et al. |
| 8,906,523 | B2 | 12/2014 | Brantner |
| 9,281,515 | B2 | 3/2016 | Nazri |
| 9,293,771 | B2 | 3/2016 | Tani et al. |
| 9,325,014 | B2 | 4/2016 | Lee et al. |
| 10,014,552 | B1 | 7/2018 | Shnitser et al. |
| 10,115,960 | B2 | 10/2018 | Lee et al. |
| 10,164,252 | B2 | 12/2018 | Yang et al. |
| 10,236,502 | B2 | 3/2019 | Kuriki et al. |
| 10,686,214 | B2 | 6/2020 | Liu et al. |
| 10,910,653 | B2 | 2/2021 | Brewer et al. |
| 11,024,842 | B2 * | 6/2021 | O'Toole ............... H01M 4/366 |
| 11,489,155 | B2 | 11/2022 | O'Toole et al. |
| 2005/0031958 | A1 | 2/2005 | Fukuoka et al. |
| 2006/0110661 | A1 | 5/2006 | Lee et al. |
| 2006/0216604 | A1 | 9/2006 | Kawase et al. |
| 2007/0207381 | A1 | 9/2007 | Ohtsuka et al. |
| 2010/0216026 | A1 | 8/2010 | Lopatin et al. |
| 2010/0285358 | A1 | 11/2010 | Cui et al. |
| 2010/0330421 | A1 | 12/2010 | Cui et al. |
| 2011/0111304 | A1 | 5/2011 | Cui et al. |
| 2011/0159365 | A1 | 6/2011 | Loveness et al. |
| 2011/0266654 | A1 | 11/2011 | Kuriki et al. |
| 2012/0121983 | A1 | 5/2012 | Yoon et al. |
| 2013/0143124 | A1 | 6/2013 | Lee et al. |
| 2014/0011088 | A1 | 1/2014 | Lopatin et al. |
| 2014/0248543 | A1 | 9/2014 | Zhu et al. |
| 2014/0335411 | A1 | 11/2014 | Liu et al. |
| 2015/0118572 | A1 | 4/2015 | Lund et al. |
| 2015/0325852 | A1 | 11/2015 | Wang et al. |
| 2016/0190564 | A1 | 6/2016 | Samarao et al. |
| 2017/0133662 | A1 | 5/2017 | Cui et al. |
| 2017/0279163 | A1 | 9/2017 | Jang et al. |
| 2017/0301616 | A1 | 10/2017 | Biederman et al. |
| 2017/0335482 | A1 | 11/2017 | Date et al. |
| 2018/0083264 | A1 | 3/2018 | Soppe |
| 2018/0123132 | A1 | 5/2018 | Kawakami et al. |
| 2018/0287130 | A1 | 10/2018 | de Souza et al. |
| 2019/0267361 | A1 | 8/2019 | Rahim et al. |

FOREIGN PATENT DOCUMENTS

| | | | |
|---|---|---|---|
| WO | 2016112333 | A1 | 7/2016 |
| WO | 2019165412 | A1 | 8/2019 |
| WO | 2021029769 | A1 | 2/2021 |

OTHER PUBLICATIONS

Cho, et al., "Electrochemical Properties of Si Film Electrodes Grown on Current Collectors with CuO Nanostructures for Thin-Film Microbatteries", Journal of Nanoscience and Nanotechnology, vol. 14, No. 12, Dec. 1, 2014, pp. 9300-9306.

Cho, et al., "Enhanced Lithium Ion battery Cycling of Silicon Nanowire Anodes by Template Growth to Eliminate Silicon Underlayer Islands", NANO Letters, vol. 13, No. 11, Oct. 2013, pp. 5740-5747.

Corte, "Effets Du Traitement Chimique De La Surface D'une Électrode Négative en Silicium Amorphe Pour Batterie Lithium-ion: Étude Par Spectroscopie Infrarouge in Situ", Ecole Polytechnique Paristech, Oct. 2013, pp. 1-139.

Domi, et al., "Effect of Mechanical Pre-Lithiation on Electrochemical Performance of Silicon Negative Electrode for Lithium-Ion Batteries", Journal of The Electrochemical Society, vol. 164, No. 7, Jun. 2, 2017, pp. A1651-A1654.

Gomez-Baquero, "Silicon Anodes to Enable Better Lithium Ion Batteries", ResearchGate, Besstect LLC, Apr. 2016, pp. 1-28.

Holstiege, et al., "Pre-Lithiation Strategies for Rechargeable Energy Storage Technologies: Concepts, Promises and Challenges", Batteries, vol. 4, No. 1, Jan. 2018, pp. 1-39.

Kim, et al., "Electrochemical Characteristics of Si/Mo Multilayer Anode for Li ion Batteries", Revista Mexicana De Fisica, vol. 53, No. 1, Jan. 2007, pp. 17-20.

Li, et al., "One-Step Synthesis of Li-Doped NiO as High-Performance Anode Material for Lithium Ion Batteries", Ceramics International, vol. 42, No. 13, Jun. 2016, pp. 14565-14572.

Lin, et al., "Optical Characterization of Hydrogenated Amorphous Silicon Thin Films Deposited at High Rate", Journal of Electronic Materials, vol. 28, No. 12, Aug. 1999, pp. 1452-1456.

Nominanda, et al., "Process and Material Properties of PECVD Boron-Doped Amorphous Silicon Film", Available Online at: https://www.electrochem.org/dl/ma/201/pdfs/0399.pdf, Jan. 2002, 1 page.

Notten, "Advanced Energy Storage Materials for Battery Applications, Advanced Materials", NL Agency Ministry of Economic Affairs, Agriculture and Innovation, Dec. 12, 2012, 50 pages.

Application No. PCT/US2020/039386, International Search Report and Written Opinion, Mailed On Sep. 25, 2020, 7 pages.

Piwko, et al., "Hierarchical Columnar Silicon Anode Structures for High Energy Density Lithium Sulfur Batteries", Journal of Power Sources, vol. 351, May 2017, pp. 183-191.

Quiroga-Gonzalez, et al., "Optimal Conditions for Fast Charging and Long Cycling Stability of Silicon Microwire Anodes for Lithium Ion Batteries, and Comparison with the Performance of Other Si Anode Concepts", Energies, vol. 6, No. 10, Oct. 10, 2013, pp. 5145-5156.

Sakabe, et al., "Porous Amorphous Silicon Film Anodes for High-Capacity and Stable All-Solid-State Lithium Batteries", Communications Chemistry, vol. 1, No. 24, May 3, 2018, pp. 1-9.

Salah, et al., "Pure Silicon Thin-Film Anodes for Lithium-Ion Batteries: A Review", Journal of Power Sources, vol. 414, Feb. 28, 2019, pp. 48-67.

Soppe, et al., "Self-Organized Nano-Structures Silicon as Anode Material for Li-Ion Batteries", Meeting of Materials Research Society, Apr. 2-6, 2018, 1 page.

Stefan, "A Commercially Scalable Process for Silicon Anode Prelithiation", DOE Merit Review, Amprius Incorporated, Project ES250, Available Online at: https://www.energy.gov/sites/prod/files/2016/06/f32/es250_stefan_2016_o_web.pdf, Jun. 6-10, 2016, pp. 1-23.

(56) References Cited

OTHER PUBLICATIONS

Sun, "Nanomembranes Based on Nickel Oxide and Germanium as Anode Materials for Lithium-Ion Batteries", Dissertation, Sep. 27, 2017, 116 pages.

Uehara, et al., "Thick Vacuum Deposited Silicon Films Suitable for the Anode of Li-Ion Battery", Journal of Power Sources, Science Direct, vol. 146, No. 1-2, Aug. 26, 2005, pp. 441-444.

Ulvestad, et al., "Silicon Nitride as Anode Material for Li-Ion Batteries: Understanding the SiNx Conversion Reaction", Journal of Power Sources, vol. 399, Sep. 30, 2018, pp. 414-421.

Ulvestad, et al., "Silicon Nitride Coated Silicon Thin Films as Anodes for Li-Ion Batteries", Electronic Clearing Service Transactions, vol. 64, No. 22, Apr. 2015, pp. 107-111.

Valladares, et al., "Characterization of Ni Thin Films Following Thermal Oxidation in Air", Journal of Science Technology B, vol. 32, No. 5, Sep.-Oct. 2014, pp. 051808-1-051808-8.

Wu, et al., "Silicon Nitride Coated Silicon Thin Film on Three Dimensions Current Collector for Lithium Ion Battery Anode", Journal of Power Sources, vol. 325, Sep. 1, 2016, pp. 64-70.

Xu, et al., "A High-Performance Li-ion Anode From Direct Deposition of Si Nanoparticles", Nano Energy, Supplemental Info, vol. 38, 2017, pp. 1-10.

Xu, et al., "A High-Performance Li-Ion Anode From Direct Deposition of Si Nanoparticles", Nano Energy, vol. 38, Jun. 2017, pp. 477-485.

Xu, et al., "Engineering the Direct Deposition of Si Nanoparticles for Improved Performance in Li-Ion Batteries", Journal of the Electrochemical Society, vol. 166, No. 3, Dec. 28, 2018, pp. A5252-A5258.

Yang, "Development of Silicon-Based Anodes and In-Situ Characterization Techniques for Lithium Ion Batteries", Jinho Yang Dissertation, Wayne State University, Jan. 1, 2014, 125 pages.

Yuan, et al., "High-Performance CuO/Cu Composite Current Collectors with Array-Pattern Porous Structures For Lithium-Ion Batteries", Electrochimica Acta, vol. 226, Feb. 1, 2017, pp. 89-97.

Zhao, et al., "A General Prelithiation Approach for Group IV Elements and Corresponding Oxides", Energy Storage Materials, Jul. 2017, pp. 1-7.

* cited by examiner

PATTERNED ANODES FOR LITHIUM-BASED ENERGY STORAGE DEVICES

CROSS REFERENCE TO RELATED APPLICATIONS

This application is a continuation of U.S. application Ser. No. 17/237,217, filed Apr. 22, 2021, which is a continuation of U.S. application Ser. No. 16/909,008, filed Jun. 23, 2020, now U.S. Pat. No. 11,024,842, which claims the benefit of U.S. Provisional Application No. 62/867,513, filed Jun. 27, 2019, all of which are hereby incorporated by reference herein in their entirety for all purposes.

TECHNICAL FIELD

The present disclosure relates to lithium ion batteries and related energy storage devices.

BACKGROUND

Silicon has been proposed for lithium-ion batteries to replace the conventional carbon-based anodes, which have a storage capacity that is limited to ~370 mAh/g. Silicon readily alloys with lithium and has a much higher theoretical storage capacity (~3600 to 4200 mAh/g at room temperature) than carbon anodes. However, insertion and extraction of lithium into the silicon matrix causes significant volume expansion (>300%) and contraction. This can result in rapid pulverization of the silicon into small particles and electrical disconnection from the current collector.

The industry has recently turned its attention to nano- or micro-structured silicon to reduce the pulverization problem, i.e., silicon in the form of spaced apart nano- or micro-wires, tubes, pillars, particles and the like. The theory is that making the structures nano-sized avoids crack propagation and spacing them apart allows more room for volume expansion, thereby enabling the silicon to absorb lithium with reduced stresses and improved stability compared to, for example, macroscopic layers of bulk silicon.

Despite research into various approaches batteries based primarily on silicon have yet to make a large market impact due to unresolved problems.

SUMMARY

There remains a need for anodes for lithium-based energy storage devices such as Li-ion batteries that are easy to manufacture, robust to handling, high in charge capacity and amenable to fast charging, for example, at least 1C.

In accordance with an embodiment of this disclosure, an anode for an energy storage device includes a current collector. The current collector includes a metal layer and a metal oxide layer provided in a first pattern overlaying the metal layer. The anode further includes a patterned lithium storage structure including a continuous porous lithium storage layer selectively overlaying at least a portion of the first pattern of metal oxide.

In accordance with another embodiment of this disclosure, a method of making an anode for use in an energy storage device includes providing a current collector having a metal layer and a metal oxide layer provided in a first pattern overlaying the metal layer. A continuous porous lithium storage layer is selectively formed by chemical vapor deposition by exposing the current collector to at least one lithium storage material precursor gas.

The present disclosure provides anodes for energy storage devices that may have one or more of at least the following advantages relative to conventional anodes: improved stability at aggressive ≥1C charging rates; higher overall areal charge capacity; higher charge capacity per gram of silicon; improved physical durability; simplified manufacturing process; and more reproducible manufacturing process.

DETAILED DESCRIPTION

It is to be understood that the drawings are for purposes of illustrating the concepts of the disclosure and may not be to scale.

Figure 1A:
FIGS. 1A-1C are series of cross-sectional views illustrating a method of making a patterned anode according to some embodiments of the present disclosure.
Figure 1B:
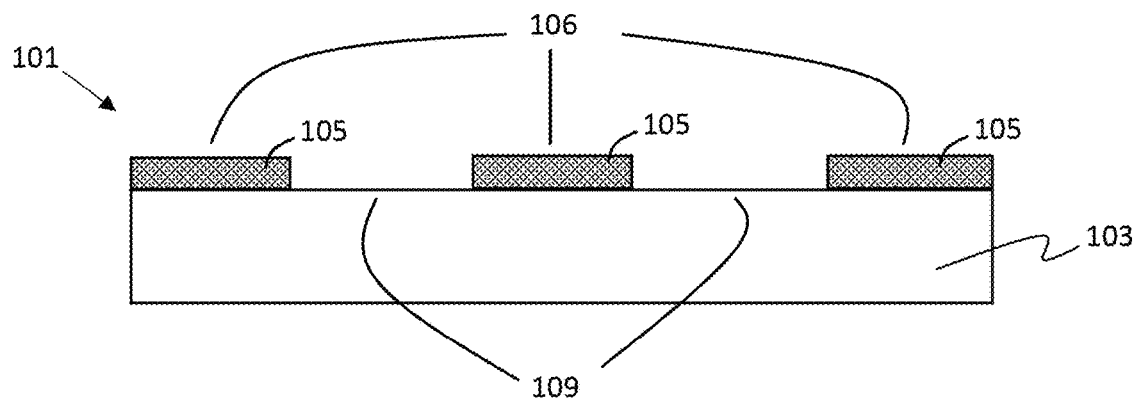
Figure 1C:
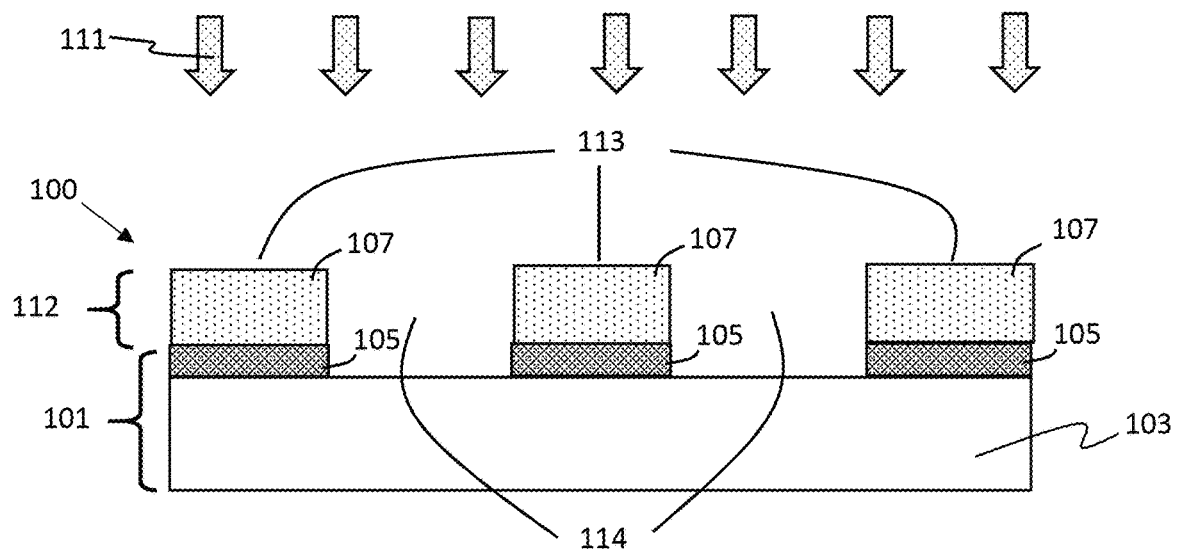

FIGS. 1A-1C are series of cross-sectional views illustrating a method of making a patterned anode according to some embodiments of the present disclosure. In FIG. 1A current collector precursor 191 is provided which includes at least an electrically conductive metal layer 103 having a surface 104. As shown in FIG. 1B, a metal oxide layer 105 is formed in a first pattern 106 over the surface 104 of the metal layer thereby forming current collector 101. The current collector further includes a complementary second pattern 109 of areas not occupied by the first pattern of metal oxide. In some embodiments, the current collector may have sufficient flexibility and strength to be wound into a battery jelly roll.

In FIG. 1C, a first lithium storage material is deposited over the current collector by a chemical vapor deposition (CVD) process including, but not limited to, hot-wire CVD or plasma-enhanced chemical vapor deposition (PECVD), using one or more appropriate lithium storage material precursor gases 111 and conditions. In some embodiments, the continuous porous first lithium storage layer 107 selectively forms on, and adheres to, the first pattern 106 of the metal oxide layer 105, but does not form on, or adheres poorly to, the second pattern 109 of areas not occupied by the metal oxide. Thus, anode 100 is provided having a patterned lithium storage structure 112 formed over current collector 101. The patterned lithium storage structure 112 includes one or more first regions 113 having a continuous porous lithium storage layer 107 including a first lithium storage material overlaying the first metal oxide layer 105 and further includes one or more second regions 114 corresponding to the second pattern 109 substantially free of the continuous porous first lithium storage layer. In some embodiments, the method may optionally further include a cleaning step (wiping, brushing, rinsing, ultrasonic treatment, or the like) to remove from the second pattern poorly adhered deposited material from the chemical vapor deposition step.

With respect to the continuous porous lithium storage layer, "selectively forms on" may mean that: i) deposition of the first lithium storage material is kinetically or thermodynamically favored on the first pattern 106 of metal oxide relative to deposition on the second pattern 109; or ii) the first lithium storage material preferentially adheres to the first pattern of metal oxide 106 relative to adherence to the second pattern 109; or iii) a combination of (i) and (ii).

Figure 2:
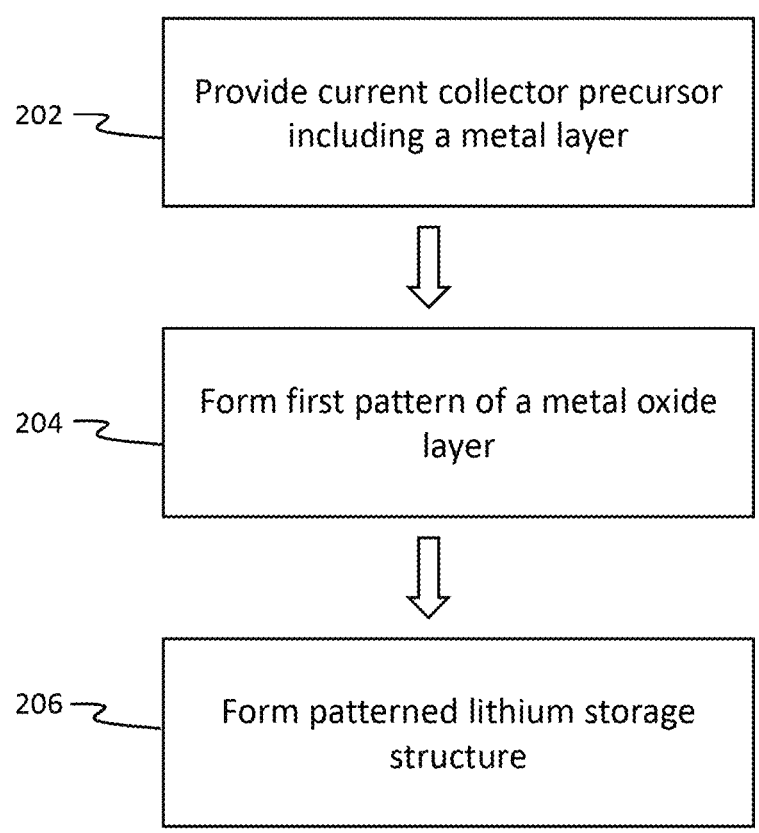
FIG. 2 is a block diagram showing steps of forming anodes according to some embodiments of the present disclosure.

FIG. 2 is a block diagram showing the general steps of forming anodes according to some embodiments of the present disclosure. Step 202 includes providing a current collector precursor, e.g., as discussed with respect to FIG. 1. In Step 204 a first pattern of a metal oxide layer is formed, e.g., as discussed with respect to FIG. 1B. In Step 206 a patterned lithium storage structure is formed, e.g., as discussed with respect to FIG. 1C.

As mentioned, the current collector precursor includes an electrically conductive metal layer. In some embodiments, the current collector precursor includes substantially no layers other than the metal layer 103. In some embodiments, the metal layer 103 may be a metal foil (shown). Alternatively, rather than a metal foil, the metal layer 103 may be in the form of a metal mesh. The metal layer may include a single metal, an alloy, or multiple layers of different metals. In some embodiments, the current collector precursor may be a multilayer structure having a substrate and the metal layer provided at one or both surfaces. The substrate may include a polymer, another metal, a ceramic or a multilayer structure of one or more of such materials. In some embodiments, the metal layer may include a transition metal or its alloys. In some embodiments, the metal layer may include titanium (or its alloys), nickel (or its alloys), copper (or its alloys), or stainless steel.

There are numerous methods available for forming a first pattern of a metal oxide layer on a surface the metal layer. In some embodiments, a surface portion of the metal layer is oxidized or otherwise chemically transformed into the metal oxide. In such case, the metal oxide may include the same metal(s) as found in a surface portion of the metal layer. In the case where the current collector precursor includes an insulating substrate and a metal layer, the depth of oxidation should generally not extend all the way through the metal layer, since that may reduce electrical connectivity to the lithium storage layer.

Figure 3:
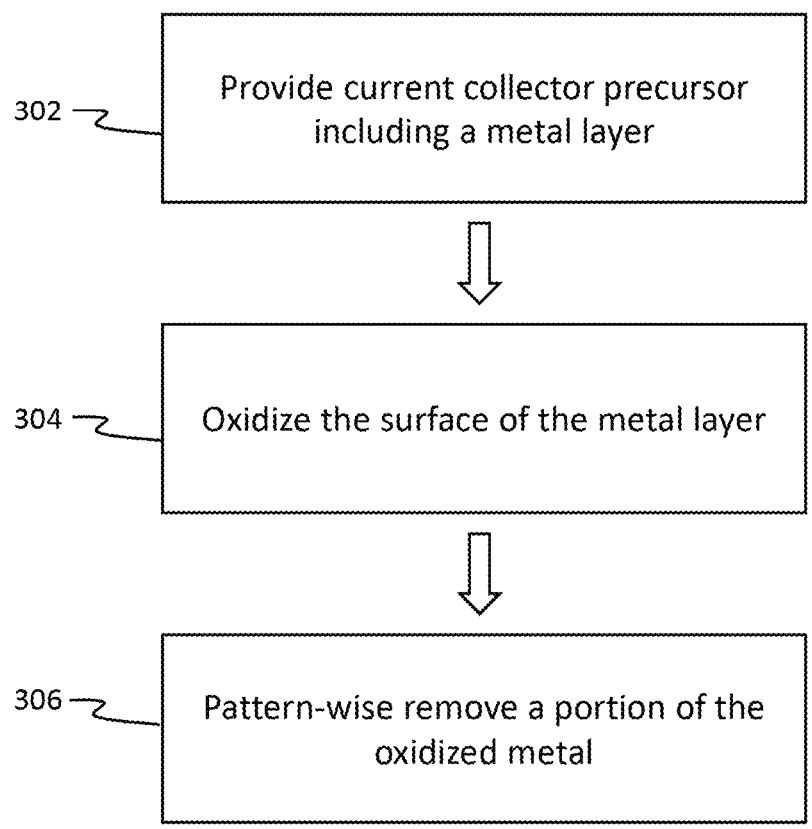
FIG. 3 is a block diagram showing steps for forming a first pattern of a metal oxide layer according to some embodiments of the present disclosure.
Figure 4A:
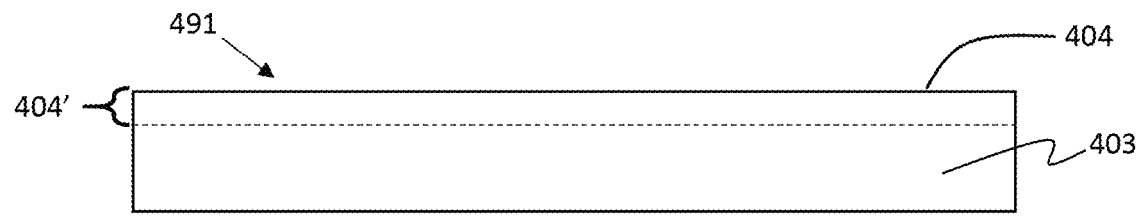
FIGS. 4A-4E are cross-sectional views that illustrate a method for forming a first pattern of a metal oxide layer according to some embodiments of the present disclosure.
Figure 4B:
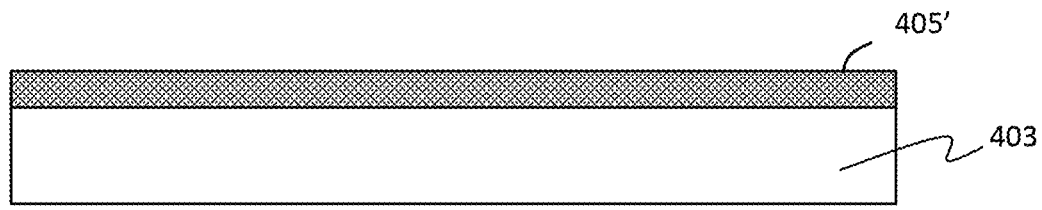

FIG. 3 is a block diagram and FIGS. 4A-4F are cross-sectional views that illustrate a method for forming a first pattern of a metal oxide layer according to some embodiments of the present disclosure. In Step 302 (FIG. 3) a current collector precursor 491 that includes an electrically conductive metal layer 403 having surface 404 (FIG. 4A) is provided. In Step 304 (FIG. 3) a predetermined surface portion 404' (FIG. 4A) of the metal layer is oxidized to form a generally non-patterned metal oxide layer 405' (FIG. 4B). There are many methods known to the skilled person for oxidizing a metal surface and the particular conditions will depend on the type of metal. For example, oxidation and formation of the metal oxide may be carried out by exposure to an oxygen-containing gas or plasma (optionally at an elevated temperature), by treating with a solution having a chemical oxidant, by electrochemical oxidation or some other method.

Figure 4C:
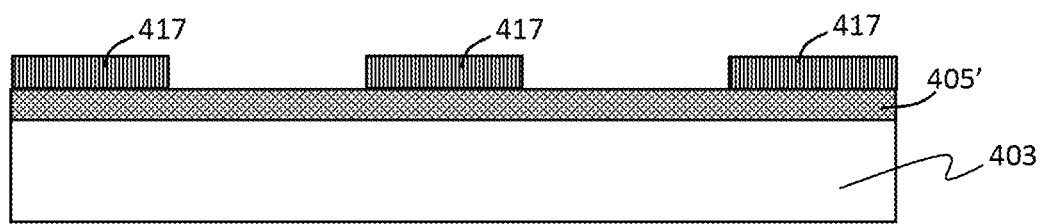
Figure 4D:
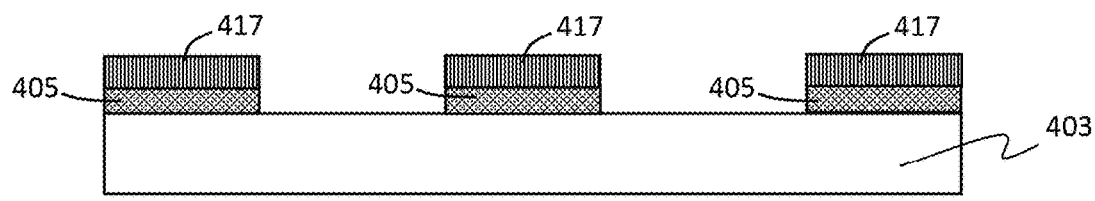
Figure 4E:
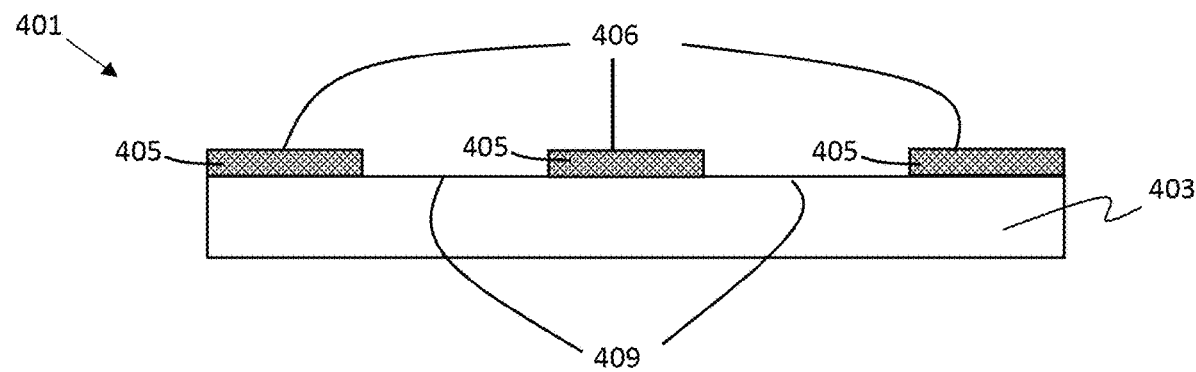

In Step 306 (FIG. 3) a portion of the oxidized metal is pattern-wise removed to form the metal oxide layer 405 in a first pattern. In some embodiments, this may be done by providing a resist material 417 in a pattern corresponding to the intended first pattern over the non-patterned metal oxide layer 405' as shown in FIG. 4C. In some embodiments, the patterned resist may be a polymer and provided by photo-patterning (coating, exposing and developing the photoresist), screen printing, inkjet printing, gravure printing, offset printing, flexographic printing or any conventional printing method. As shown in FIG. 4D, this may be followed by a treatment to etch the metal oxide, e.g., a treatment in a solution that dissolves metal oxide but not the resist such an acid solution or a metal chelate-containing solution (or both) to form metal oxide layer 405 in a first pattern. The resist may then be removed by an appropriate stripping agent or solvent to form current collector 401 (FIG. 4E) having metal oxide layer 405 in a first pattern 406 overlaying metal layer 403 and a complementary second pattern 409 of areas not occupied by the metal oxide.

Figure 5A:
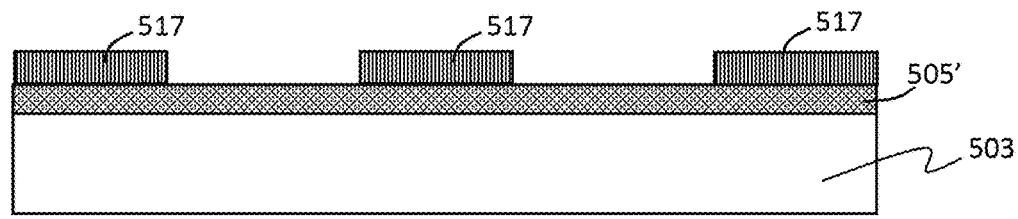
FIGS. 5A-5C are cross-sectional views that illustrate a method for forming a first pattern of a metal oxide layer according to some embodiments of the present disclosure.
Figure 5B:
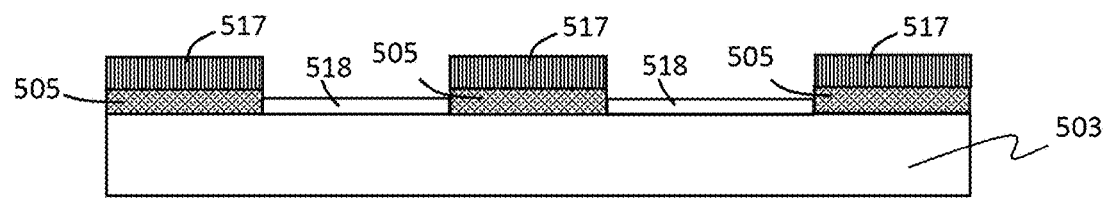
Figure 5C:
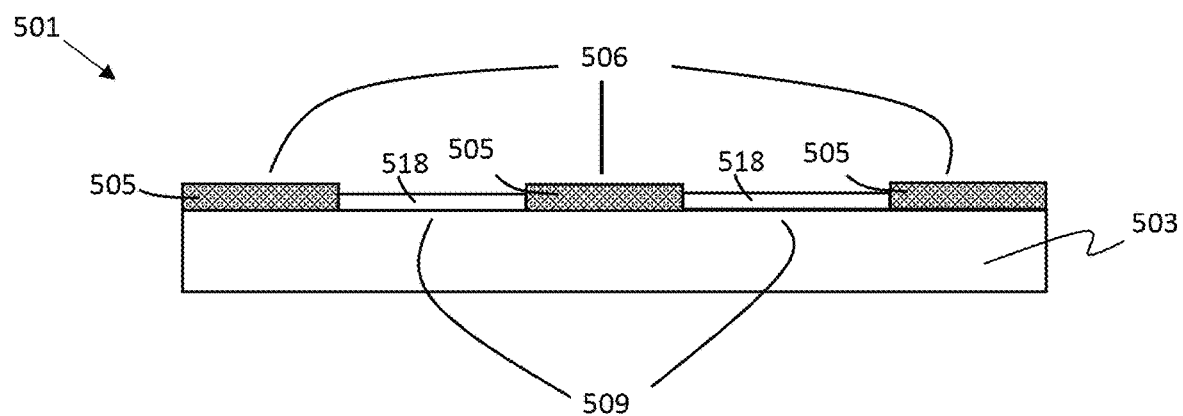

Alternatively, instead of etching, the metal oxide may be removed by reducing it back to metallic form, i.e. metal with an oxidation state of 0. For example, FIG. 5A shows a structure having a resist material 517 provided in a pattern corresponding to the intended first pattern over a non-patterned metal oxide layer 505' which overlays metal layer 503. Referring to FIG. 5B, areas of the metal oxide 505' not covered by the resist material 517 may be electrochemically or chemically reduced to form areas of reductively formed metal 518. As shown in FIG. 5C, the resist material may be removed by an appropriate stripping agent or solvent to form current collector 501 having metal oxide layer 505 in a first pattern 506 and a complementary second pattern 509 of areas not occupied by the metal oxide, the second pattern corresponding to the reductively formed metal 518. In some embodiments, rather than reducing the entire thickness of the metal oxide layer in the regions not covered by the resist material, only a surface portion may be reduced (not shown).

It should be noted that the second pattern (109, 409, 509) may correspond to metallic areas of the current collector, and while not having the metal oxide layer (105, 405, 505), may nevertheless have a small amount of surface oxide. In some embodiments, any such oxide in the second pattern may be less than 25% in thickness relative to the thickness of metal oxide layer in the first pattern, alternatively less than 10%, alternatively less than 5%, alternatively less than 2%.

Figure 6:
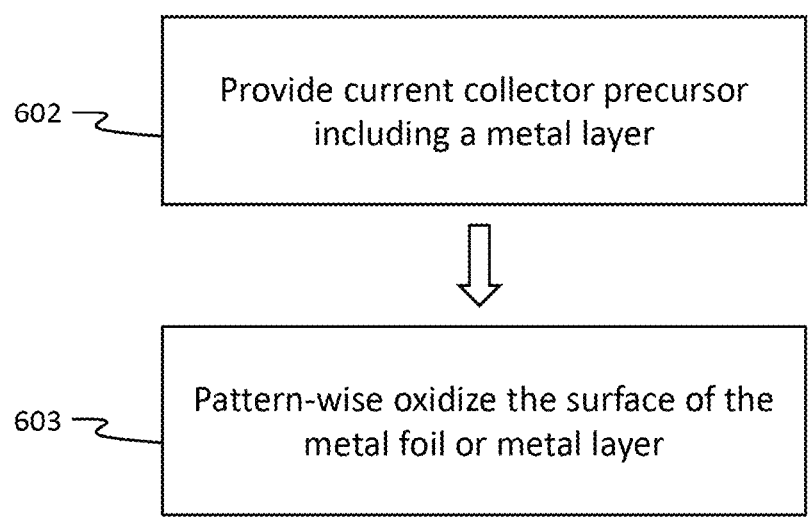
FIG. 6 is a block diagram showing steps for forming a first pattern of a metal oxide layer according to some embodiments of the present disclosure.
Figure 7A:
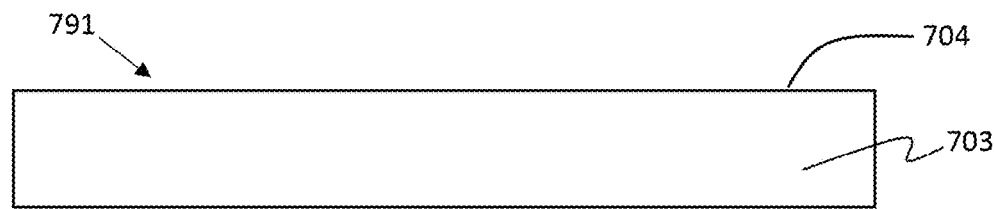
FIGS. 7A-7D are cross-sectional views that illustrate a method for forming a first pattern of a metal oxide layer according to some embodiments of the present disclosure.
Figure 7B:
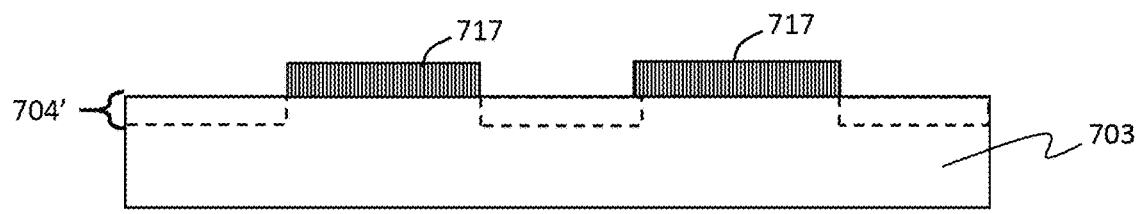
Figure 7C:
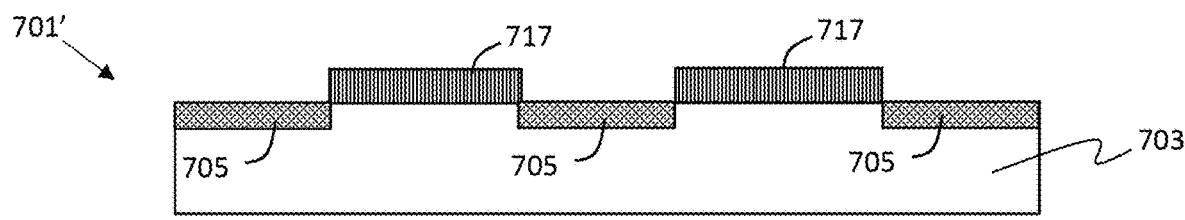
Figure 7D:
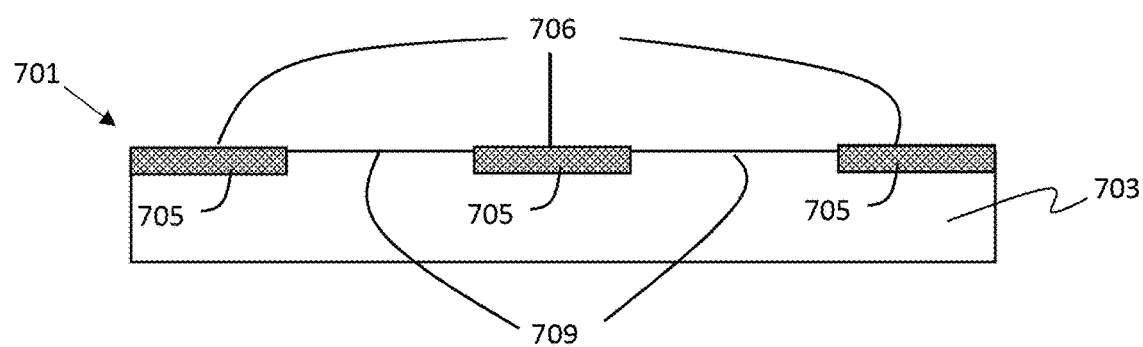

FIG. 6 is a block diagram and FIGS. 7A-7D are cross-sectional views that illustrate steps for forming a first pattern of a metal oxide layer according to some other embodiments of the present disclosure. In Step 602 a current collector precursor 791 that includes metal layer 703 having surface 704 is provided. In Step 603, a predetermined surface portion 704' of the metal layer is pattern-wise oxidized. As shown in FIGS. 7A-7D, in some embodiments, this may be done by applying an oxidation resistant material 717 in a pattern corresponding to the intended second pattern over surface 704. That is, the oxidation resistant material 717 is provided over areas of the metal layer other than the intended first pattern. This may be followed by an oxidation step, e.g., by exposure to an oxygen-containing gas or plasma (optionally at an elevated temperature), by treating with a solution having a chemical oxidant, by electrochemical oxidation or some other method. The patterned oxidation resistant material slows or prevents substantial oxidation of the underlying metal layer but allows oxidation of non-covered areas corresponding to the intended first pattern, thereby forming a first pattern 706 of a metal oxide layer 705. In some embodiments, the patterned oxidation resistant material may include a polymer and may be provided by photo-patterning (coating, exposing and developing the oxidation resistant photoresist), screen printing, inkjet printing, gravure printing, offset printing, flexographic printing or any conventional printing method. Alternatively, the patterned oxidation resistant material may be a metal or a metal-containing compound that may be provided by photo-patterning (e.g., by photolithographic methods), printing or by vapor deposition through a shadow mask. Alternatively, the patterned oxidation resistant material 717 may be a modified surface, e.g., of a monolayer material that alters wetting properties thereby slowing oxidation. In some embodiments, the patterned oxidation resistant material 717 may be removed using an appropriate stripping agent or solvent to form current collector 701 having the first pattern of metal oxide layer and a complementary second pattern 709 without the metal oxide layer (FIG. 7D). In some embodiments, the patterned oxidation resistant material 717 is not removed and may remain part of the current collector 701' (FIG. 7C).

In some embodiments (not shown in the figures), rather than using a patterned oxidation resistant material 717, pattern-wise oxidation of the metal layer may be performed directly by printing an oxidant in the desired first pattern.

Figure 8A:
FIGS. 8A-8C are cross-sectional views that illustrate a method for forming a first pattern of a metal oxide layer according to some embodiments of the present disclosure.
Figure 8B:
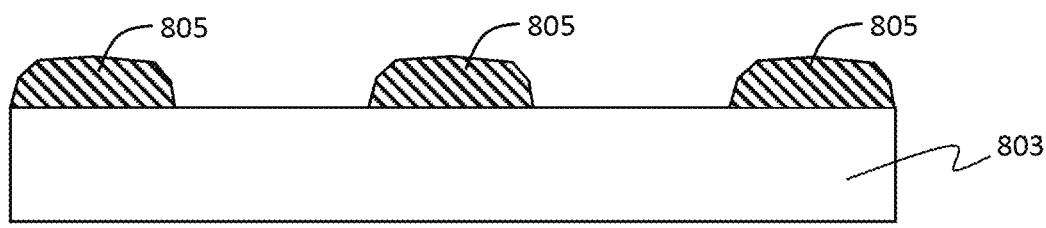
Figure 8C:
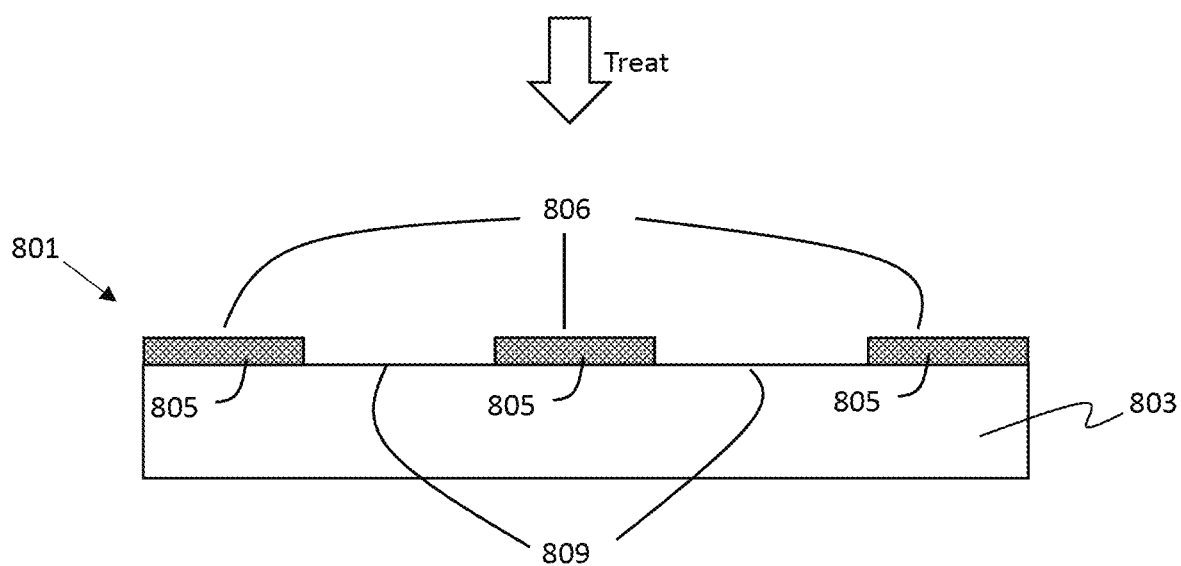

In some embodiments, rather than oxidizing the metal layer, the first pattern of metal oxide may be provided by additive methods over the current collector precursor. For example, as shown in FIG. 8, a metal oxide layer precursor composition 805 may be printed onto a surface layer 804 of metal layer 803 in a pattern corresponding to the first pattern, then treated to form current collector 801 having a first pattern 806 of metal oxide layer 805 and a complementary second pattern 809 not having the metal oxide layer. Some non-limiting examples of metal oxide precursor compositions include sol-gels (metal alkoxides), metal carbonates, metal acetates (including organic acetates), metal hydroxides and metal oxide dispersions that are thermally treated to form the first pattern of metal oxide. Alternatively, in some embodiments, the metal oxide layer precursor composition includes a metal that is treated with an oxidant (e.g., as previously described) under conditions where the metal oxide layer precursor is readily oxidized but current collector precursor is not. The metal oxide precursor composition may include a metal that is the same as or different from the metal(s) of the metal layer. In some embodiments, multiple metal precursor compositions may be used to form a pattern of different metal oxides or multilayer structure of different metal oxides.

In some embodiments, a non-patterned metal oxide precursor composition layer may be provided over the current collector precursor and treated to form a metal oxide layer. It may then be patterned, for example, as described with respect to FIGS. 4 and 5.

In some embodiments, a non-patterned metal oxide layer may be provided over the current collector precursor by atomic layer deposition (ALD), CVD, evaporation or sputtering. It may then be patterned, for example, as described with respect to FIGS. 4 and 5.

Figure 9:
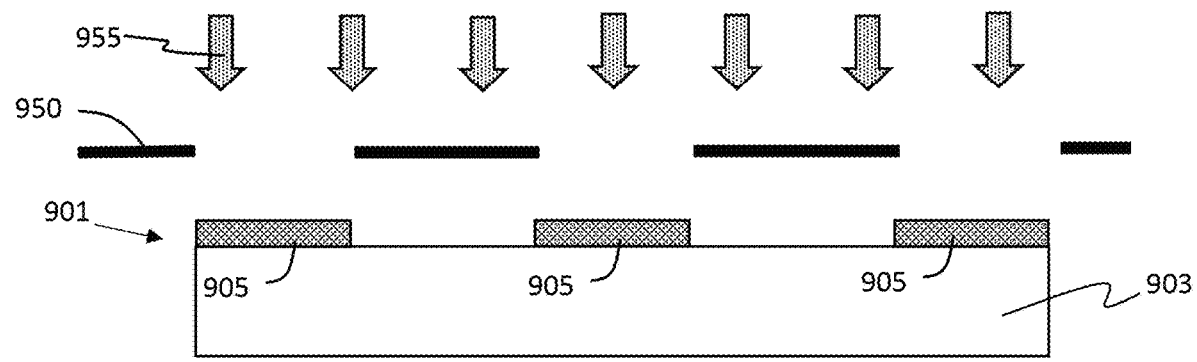
FIG. 9 is a cross-sectional view illustrating a method for forming a first pattern of a metal oxide layer by vapor deposition according to some embodiments of the present disclosure.

In some embodiments, first pattern of first metal oxide layer 905 may be provided by deposition of a vaporized metal oxide 955 through a shadow mask 950 onto metal layer 903 to form current collector 901, as shown in FIG. 9.

The metal oxide layer may include a mixture of metal oxides having homogeneously or heterogeneously distributed oxide stoichiometries, mixtures of metals or both. The metal oxide layer should be sufficiently electrically conductive (non-insulating) to allow transfer of electrical charge between metal layer and the continuous porous lithium storage layer. The metal oxide layer may include dopants or regions of unoxidized metal that promote electrical conductivity.

In some embodiments, the metal oxide layer includes a transition metal oxide, e.g., an oxide of nickel, titanium or copper. As mentioned, the metal oxide layer may include mixtures of metals. For example, an "oxide of nickel" may optionally include other metals in addition to nickel but in lesser amount. In some embodiments, the metal oxide layer has an average thickness of at least 0.020 µm, alternatively at least 0.030 µm, alternatively at least 0.050 µm, alternatively 0.1 µm, alternatively, at least 0.2 µm, alternatively at least 0.5 µm. In some embodiments, the metal oxide layer has an average thickness in a range of 0.02 µm to 0.03 µm, alternatively 0.03 µm to 0.05 µm, alternatively 0.05 µm to 0.1 µm, alternatively 0.1 µm to 0.2 µm, alternatively 0.2 µm to 0.5 µm, alternatively 0.5 µm to 1 µm, alternatively 1 µm to 2 µm, alternatively 2 µm to 5 µm, alternatively 5 µm to 10 µm, or any combination of contiguous ranges thereof. The metal oxide layer may include a stoichiometric oxide, a non-stoichiometric oxide or regions of both. In some embodiments, the metal within the metal oxide may exist in a single oxidation state. In other embodiments, the metal within the metal oxide layer may exist in multiple oxidation states. In some embodiments the metal oxide layer may have a gradient of oxygen content where the atomic % of oxygen adjacent to the metal layer is lower than the atomic % adjacent to the lithium storage layer.

In some embodiments, the metal oxide is formed in the same chamber as, or in line with, a tool used to deposit the continuous porous lithium storage layer. In some embodiments, the metal oxide layer itself may have some reversible or irreversible lithium storage capacity. In some embodiments, the reversible capacity of the metal oxide layer is lower than that of the continuous porous lithium storage layer. In some embodiments, the metal oxide layer may be porous.

As mentioned previously, in some embodiments the metal oxide may be formed by oxidizing a surface region of a metal layer. This method is amenable to high-volume and low-cost production of current collectors. The oxidation conditions depend upon the metal/metal surface, the target oxide thickness and the desired oxide porosity. Unless otherwise stated, any reference to a particular metal includes alloys of that metal. For example, nickel foil may include pure nickel or any alloy of nickel wherein nickel is the primary component. In some embodiments, an alloyed metal also oxidizes, and the oxide of nickel formed from the alloy may include that corresponding oxidized metal. In some embodiments, the current collector is formed by thermal oxidation of a nickel substrate, e.g., a nickel foil, in ambient air in a furnace brought to a temperature of at least 300° C., alternatively at least 400° C., for example in a range of about 600° C. to about 900° C., or alternatively higher temperatures. The hold time depends upon the selected temperature and the desired thickness/porosity for the metal oxide layer. In some embodiments, the oxidation hold time will be in a range of about 1 minute to about 2 hours, but shorter or longer times are contemplated. A surface pretreatment step may be applied to promote or otherwise control oxidation. Other metals such as copper and titanium may have other operational hold times, temperatures and pretreatments according to their propensity to be oxidized.

As mentioned, the current collector may include two or more sublayers differing in chemical composition. For example, the current collector may include metallic copper foil as a first electrically conductive sublayer, a second electrically conductive sublayer of metallic nickel provided over the copper, and a patterned layer of a nickel oxide over the metallic nickel. Similarly, the metal oxide layer may include two or more sublayers differing in chemical composition. For example, the current collector may include a metallic copper foil, a sublayer of a copper oxide over the copper foil and a sublayer of titanium dioxide over the copper oxide. Such sublayers may be discrete or take the form of a gradient in chemical composition. In some embodiments there may be a gradient or transition zone between the metal layer(s) and the metal oxide layer(s).

Figure 10:
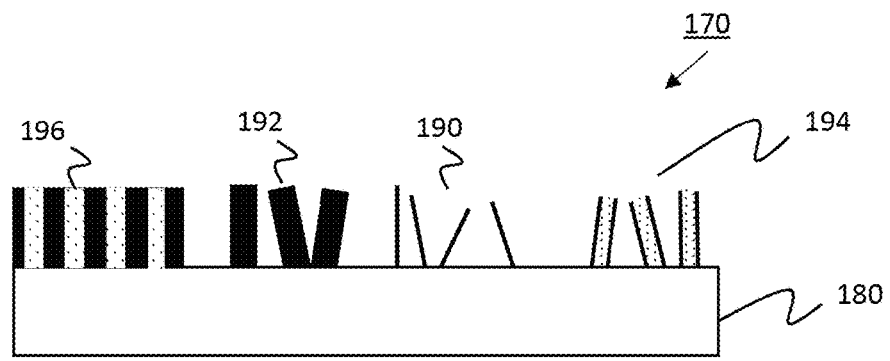
FIG. 10 is a cross-sectional view of a prior art anode that includes some examples of nanostructures.

Referring again to FIG. 1, patterned lithium storage structure 112 includes one or more first regions 113 having a continuous porous lithium storage layer 107 including a first lithium storage material overlaying the first pattern of metal oxide layer 105. In the present disclosure, the continuous porous lithium storage layer 107 is substantially free of nanostructures in the form of spaced-apart wires, pillars, tubes or the like, or in the form of ordered linear vertical channels extending through the lithium storage layer. FIG. 10 shows a cross-sectional view of a prior art anode 170 that includes some non-limiting examples of nanostructures, such as nanowires 190, nanopillars 192, nanotubes 194 and nanochannels 196 provided over a prior art current collector 180. The term "nanostructure" herein generally refers to an active material structure (for example, a structure of silicon, germanium or their alloys) having at least one cross-sectional dimension that is less than about 2,000 nm, other than a dimension approximately normal to an underlying substrate (such as a layer thickness) and excluding dimensions caused by random pores. Similarly, the terms "nanowires", "nanopillars" and "nanotubes" refers to wires, pillars and tubes, respectively, at least a portion of which, have a diameter of less than 2,000 nm. In some embodiments, the continuous porous lithium storage layer is considered "substantially free" of nanostructures when the total area of the one or more first regions 113 has an average of fewer than 5 nanostructures per 1000 square microns (in which the number of nanostructures is the sum of the number of nanowires, nanopillars, and nanotubes in the same unit area), such nanostructures having an aspect ratio of 3:1 or higher. Alternatively, there is an average of fewer than 1 such nanostructures per 1000 square micrometers.

The continuous porous lithium storage layer includes a porous material capable of reversibly incorporating lithium. In some embodiments, the continuous porous lithium storage layer includes silicon, germanium or a mixture of both. In some embodiments, the continuous porous lithium storage layer includes antimony or tin. In some embodiments, the continuous porous lithium storage layer is substantially amorphous. In some embodiments, the continuous porous lithium storage layer includes substantially amorphous silicon. Such substantially amorphous storage layers may include a small amount (e.g., less than 20 atomic %) of crystalline material dispersed therein. The continuous porous lithium storage layer may include dopants such as hydrogen, boron, phosphorous or metallic elements. In some embodiments the continuous porous lithium storage layer may include porous substantially amorphous hydrogenated silicon (a-Si:H), having, e.g., a hydrogen content of from 0.1 to 20 atomic %, or alternatively higher. In some embodiments, the continuous porous lithium storage layer may include methylated amorphous silicon. Note that, unless referring specifically to hydrogen content, any atomic % metric used herein for a lithium storage material or layer refers to all atoms other than hydrogen.

In some embodiments, the continuous porous lithium storage layer includes at least 40 atomic % silicon, germanium or a combination thereof, alternatively at least 50 atomic %, alternatively at least 60 atomic %, alternatively at least 70 atomic %, alternatively, at least 80 atomic %, alternatively at least 90 atomic %. In some embodiments, the continuous porous lithium storage layer includes at least 40 atomic % silicon, alternatively at least 50 atomic %, alternatively at least 60 atomic %, alternatively at least 70 atomic %, alternatively, at least 80 atomic %, alternatively at least 90 atomic %, alternatively at least 95 atomic %, alternatively at least 97 atomic %.

In some embodiments, the continuous porous lithium storage layer includes less than 10 atomic % carbon, alternatively less than 5 atomic %, alternatively less than 2 atomic %, alternatively less than 1 atomic %, alternatively less than 0.5 atomic %. In some embodiments, the continuous porous lithium storage layer includes less than 1% by weight of carbon-based binders, graphitic carbon, graphene, graphene oxide, reduced graphene oxide, carbon black, and conductive carbon.

The continuous porous lithium storage layer includes voids or interstices (pores), which may be random or non-uniform with respect to size, shape and distribution. Such porosity does not result in, or a result from, the formation of any recognizable nanostructures such as nanowires, nanopillars, nanotubes, nanochannels or the like. In some embodiments, the pores are polydisperse. In some embodiments, when analyzed by SEM cross section, 90% of pores larger than 100 nm in any dimension are smaller than about 5 μm in any dimension, alternatively smaller than about 3 μm, alternatively smaller than about 2 μm. In some embodiments, the continuous porous lithium storage layer may include some pores that are smaller than 100 nm in any dimension, alternatively smaller than 50 nm in any dimension, alternatively smaller than 20 nm in any dimension. In some embodiments the continuous porous lithium storage layer has an average density in a range of 1.0-1.1 g/cm³, alternatively 1.1-1.2 g/cm³, alternatively 1.2-1.3 g/cm³, alternatively 1.3-1.4 g/cm³, alternatively 1.4-1.5 g/cm³, alternatively 1.5-1.6 g/cm³, alternatively 1.6-1.7 g/cm³, alternatively 1.7-1.8 g/cm³, alternatively 1.8-1.9 g/cm³, alternatively 1.9-2.0 g/cm³, alternatively 2.0-2.1 g/cm³, alternatively 2.1-2.2 g/cm³, alternatively 2.2-2.25 g/cm³, or any combination of contiguous ranges thereof, and includes at least 80 atomic % silicon, alternatively at least 90 atomic % silicon, alternatively at least 95 atomic % silicon.

Figure 11:
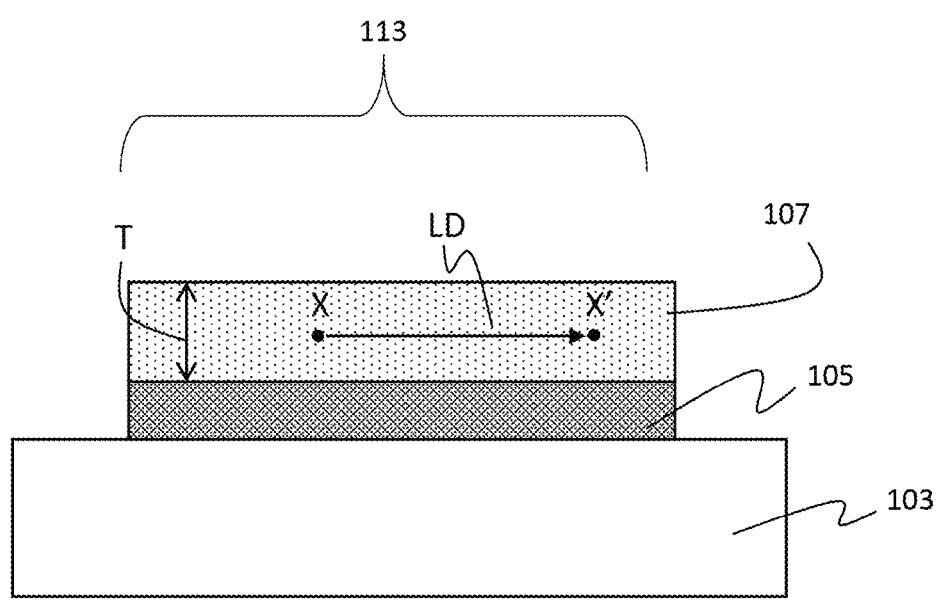
FIG. 11 is a cross-sectional view of a continuous porous lithium storage layer according to some embodiments of the present disclosure.

In some embodiments, the majority of active material (e.g., silicon, germanium or alloys thereof) of the continuous porous lithium storage layer has substantial lateral connectivity across portions of the current collector creating, such connectivity extending around random pores and interstices (as discussed later). Referring to FIG. 11, there is shown a magnified cross-sectional view of one of the first regions 113 having a continuous porous lithium storage layer 107 including a first lithium storage material overlaying the first pattern of metal oxide layer 105. In some embodiments, "substantial lateral connectivity" means that active material at one point X in the continuous porous lithium storage layer 107 may be connected to active material at a second point X' in the layer at a straight-line lateral distance LD that is at least as great as the thickness T of the continuous porous lithium storage layer, alternatively, a lateral distance at least 2 times as great as the thickness, alternatively, a lateral distance at least 3 times as great as the thickness. Not shown, the total path distance of material connectivity, including circumventing pores, may be longer than LD. In some embodiments, the continuous porous lithium storage layer may be described as a matrix of interconnected silicon, germanium or alloys thereof, with random pores and interstices embedded therein. In some embodiments, the continuous porous lithium storage layer has a sponge-like form. In some embodiments, about 75% or more of the metal oxide layer surface is contiguous with the continuous porous lithium storage layer. "Continuous," as used in describing the porous lithium storage layer, may refer to the contiguous property of the lithium storage layer within a pattern, even if the pattern itself includes discrete sections of the porous lithium storage layer.

CVD

CVD generally involves flowing a precursor gas, a gasified liquid in terms of direct liquid injection CVD or gases and liquids into a chamber containing one or more objects, typically heated, to be coated. Chemical reactions may occur on and near the hot surfaces, resulting in the deposition of a thin film on the surface. This is accompanied by the production of chemical by-products that are exhausted out of the chamber along with unreacted precursor gases. As would be expected with the large variety of materials deposited and the wide range of applications, there are many variants of CVD that may be used to form the lithium storage layer, the metal silicide layer, a supplemental layer (see below) or other layer. It may be done in hot-wall reactors or cold-wall reactors, at sub-torr total pressures to above-atmospheric pressures, with and without carrier gases, and at temperatures typically ranging from 100-1600° C. in some embodiments. There are also a variety of enhanced CVD processes, which involve the use of plasmas, ions, photons, lasers, hot filaments, or combustion reactions to increase deposition rates and/or lower deposition temperatures. Various process conditions may be used to control the deposition, including but not limited to, temperature, precursor material, gas flow rate, pressure, substrate voltage bias (if applicable), and plasma energy (if applicable).

As mentioned, the continuous porous lithium storage layer, e.g., a layer of silicon or germanium or both, may in some embodiments be provided by plasma-enhanced chemical vapor deposition (PECVD). The lithium storage material may selectively form and/or adhere to the first pattern of the first metal oxide layer, but forms on or adheres poorly to other areas. Relative to CVD, deposition by PECVD can often be done at lower temperatures and higher rates, which can be advantageous for higher manufacturing throughput. In some embodiments, the PECVD is used to deposit a substantially amorphous silicon layer (optionally doped) over the metal oxide layer. In some embodiments, PECVD is used to deposit a substantially amorphous continuous porous silicon layer over the metal oxide layer.

In some embodiments, relative to conventional lithium storage materials, the continuous porous lithium storage layer may have improved stability at aggressive >1C charging rates; higher overall areal charge capacity; higher charge capacity per gram of active material; improved physical durability; simplified manufacturing process; and more reproducible manufacturing process.

PECVD

In PECVD processes, according to various implementations, a plasma may be generated in a chamber in which the substrate is disposed or upstream of the chamber with plasma effluents fed into the chamber. Various types of plasmas may be used including, but not limited to, capacitively-coupled plasmas, inductively-coupled plasmas, and conductively-coupled plasmas. Any appropriate plasma source may be used, including DC, AC, RF, VHF, combinatorial PECVD and microwave sources may be used.

PECVD process conditions (temperatures, pressures, precursor gases, carrier gasses, dopant gases, flow rates, energies and the like) can vary according to the particular process and tool used, as is well known in the art.

In some implementations, the PECVD process is an expanding thermal plasma chemical vapor deposition (ETP-PECVD) process. In such a process, a plasma generating gas is passed through a direct current arc plasma generator to form a plasma, with a web or other substrate including the current collector optionally in an adjoining vacuum chamber. A silicon source gas is injected into the plasma, with radicals generated. The plasma is expanded via a diverging nozzle and injected into the vacuum chamber and toward the substrate. An example of a plasma generating gas is argon (Ar). In some embodiments, the ionized argon species in the plasma collide with silicon source molecules to form radical species of the silicon source, resulting in deposition onto the current collector. Example ranges for voltages and currents for the DC plasma source are 60 to 80 volts and 40 to 70 amperes, respectively.

Any appropriate silicon source may be used to deposit silicon, including silane ($SiH_4$), dichlorosilane ($H_2SiCl_2$), monochlorosilane ($H_3SiCl$), trichlorosilane ($HSiCl_3$), silicon tetrachloride ($SiCl_4$), and diethylsilane. Depending on the gas(es) used, the silicon layer may be formed by decomposition or reaction with another compound, such as by hydrogen reduction. In some embodiments, the gases may include a silicon source such as silane, a noble gas such as helium, argon, neon or xenon, optionally one or more dopant gases.

In some embodiments, the metal layer includes a transition metal or a transition metal layer capable of forming metal silicide structures when subjected to a vaporized silicon source and elevated temperatures. In some embodiments, the metal layer includes nickel or a nickel layer and PECVD silicon deposition conditions are selected to form nickel silicide structures such as nanowires or microwires in the second pattern, for example, by subjecting the nickel-containing electrically conductive layer to a temperature in a range of 450-550° C. As discussed below, the continuous porous lithium storage layer of silicon may concurrently deposit over the first pattern of metal oxide layer along with the metal silicide structures in the second pattern areas. However, to avoid substantial growth of such metal silicide structures in the second pattern, the temperature may be lower, for example, to a range of 150 to 375° C., sufficient to deposit the silicon of the continuous porous lithium storage layer.

The thickness or mass per unit area of the continuous porous lithium storage layer depends on the storage material, desired charge capacity and other operational and lifetime considerations. Increasing the thickness typically provides more capacity. If the continuous porous lithium storage layer becomes too thick, electrical resistance may increase and the stability may decrease, e.g., due to pulverization effects. In some embodiments, the anode may be characterized as having an active silicon areal density of at least 0.2 mg/cm$^2$, alternatively 0.5 mg/cm$^2$, alternatively 1 mg/cm$^2$, alternatively at least 2 mg/cm$^2$, alternatively at least 3 mg/cm$^2$, alternatively at least 5 mg/cm$^2$. In some embodiments, the lithium storage structure may be characterized as having an active silicon areal density in a range of 0.5-1 mg/cm$^2$, alternatively in a range of 1-2 mg/cm$^2$, alternatively in a range of 2-3 mg/cm$^2$, alternatively in a range of 3-5 mg/cm$^2$, alternatively in a range of 5-10 mg/cm$^2$, alternatively in a range of 10-15 mg/cm$^2$, alternatively in a range of 15-20 mg/cm$^2$, or any combination of contiguous ranges thereof. "Active silicon" refers to the silicon in electrical communication with the current collector that is available for reversible lithium storage at the beginning of cell cycling, e.g., after anode "electrochemical formation" discussed later. "Areal density" refers to the surface area of the electrically conductive layer over which active silicon is provided. In some embodiments, not all of the silicon content is active silicon, i.e., some may be tied up in the form of non-active silicides or electrically isolated from the current collector.

In some embodiments the continuous porous lithium storage layer has an average thickness of at least 0.5 µm. In some embodiments, the continuous porous lithium storage layer has an average thickness in a range of about 0.5 µm to about 50 µm. In some embodiments, the continuous porous lithium storage layer comprises at least 80 atomic % amorphous silicon and has a thickness in a range of 0.5 to 1 µm, alternatively 1-2 µm, alternatively 2-5 µm, alternatively 5-10 µm, alternatively 10-20 µm, alternatively 20-30 µm, alternatively 30-40 µm, alternatively 40-50 µm, or any combination of contiguous ranges thereof.

In some embodiments, the continuous porous lithium storage layer includes silicon but does not contain a substantial amount of crystalline silicides, i.e., the presence of silicides is not readily detected by X-Ray Diffraction (XRD). Metal silicides, e.g., nickel silicide, commonly form when silicon is deposited at higher temperatures directly onto metal, e.g., nickel foil. Metal silicides such as nickel silicides often have much lower lithium storage capacity than silicon itself. In some embodiments, the average atomic % of silicide-forming metallic elements within the continuous porous lithium storage layer are on average less than 35%, alternatively less than 20%, alternatively less than 10%, alternatively less than 5%. In some embodiments, the average atomic % of silicide-forming metallic elements within the continuous porous lithium storage layer are in a range of about 0.1 to 10%, alternatively about 0.2 to 5%. In some embodiments, the atomic % of silicide forming metallic elements in the continuous porous lithium storage layer is higher nearer the current collector than away from the current collector.

Patterns According to various embodiments of the present disclosure, the one or more first regions of the continuous porous lithium storage layer may easily be provided in almost any pattern desired, enabling a multitude of potential functionalities. FIGS. 12A-12F are plan views of anodes 1200A-1200F having variously patterned lithium storage structures 1212A-1212F. Each includes one or more first regions 1213A-1213F having a continuous porous lithium storage layer including a first lithium storage material overlaying the first metal oxide layer (not visible in the plan view) and further including one or more second regions 1214A-1214B substantially free of the continuous porous first lithium storage layer. Note that the term "patterned lithium storage structure" generally refers to the apparent 2D pattern of the lithium storage material formed over the current collector, for example, as shown in plan views of FIGS. 12A-12F.

Figure 12A:
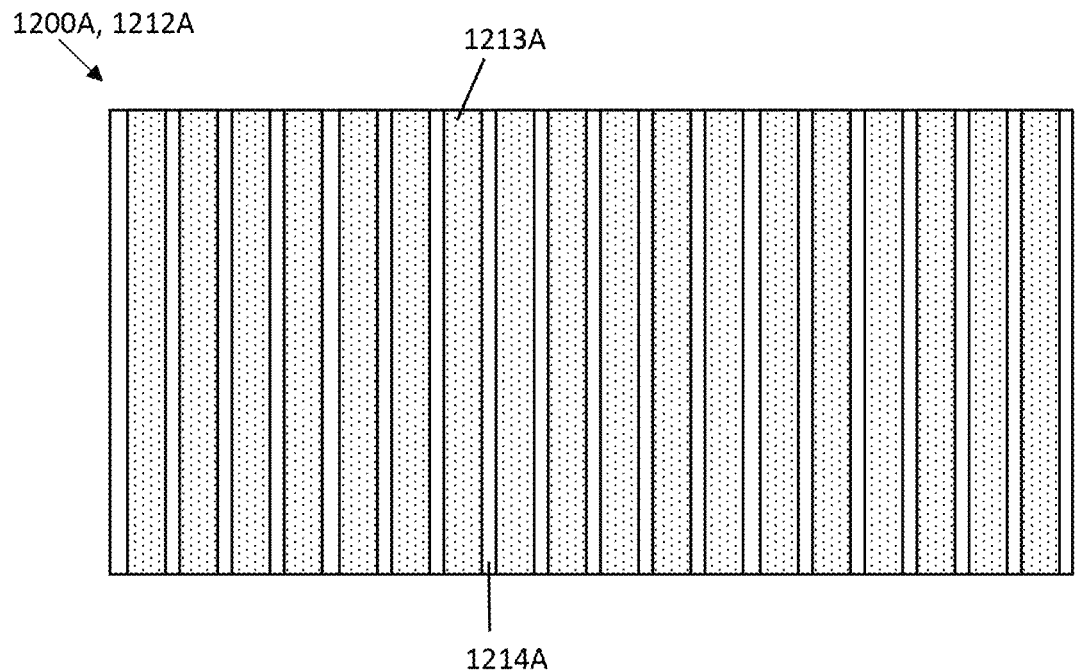
FIGS. 12A-12F are plan views of anodes having variously patterned lithium storage structures according to some embodiments of the present disclosure.

In FIG. 12A, anode 1200A includes patterned lithium storage structure 1212A having one or more first regions 1213A patterned as stripe features extending from about one end of the current collector to the other and separated by one or more second regions 1214B. In some embodiments, the anode may be wound into a jelly roll energy storage device along with a cathode and one or more separators. The stripe features may be provided in a direction parallel to the axis of winding. In this way, the potential stress on the lithium storage layer caused by bending during winding is reduced and controlled. Without the pattern, the lithium storage layer may randomly crack and delaminate during winding.

Figure 12B:
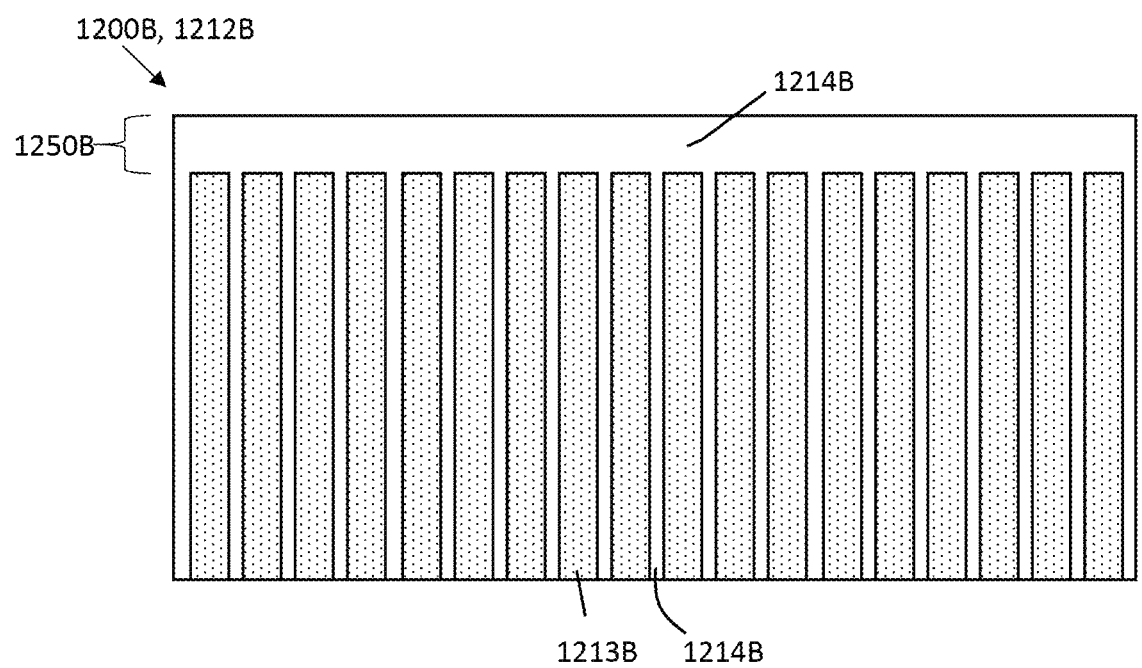

In FIG. 12B, anode 1200B includes patterned lithium storage structure 1212B having one or more first regions 1213B patterned as stripe features similar to FIG. 12A, but a contact tab region 1250B is also provided as part of the one or more second regions 1214B. In some embodiments the contact tab region 1250B is substantially free of metal oxide and lithium storage material, thereby enabling easy contact of the metal layer to an anode terminal, with reduced or no need to etch, rub or clean off the area.

Figure 12C:
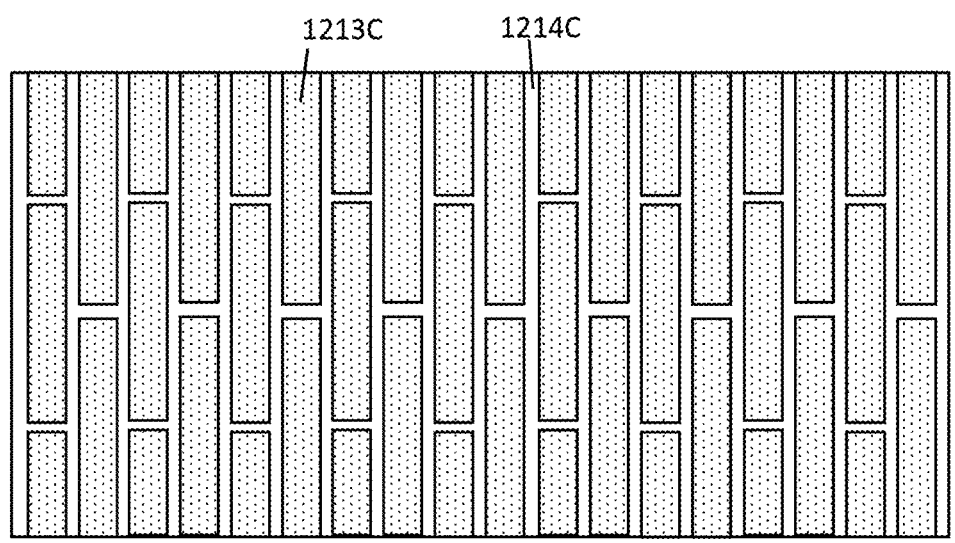

In FIG. 12C, anode 1200C includes patterned lithium storage structure 1212C having one or more first regions 1213C patterned as rectangular islands separated by one or more second regions 1214C.

Figure 12D:
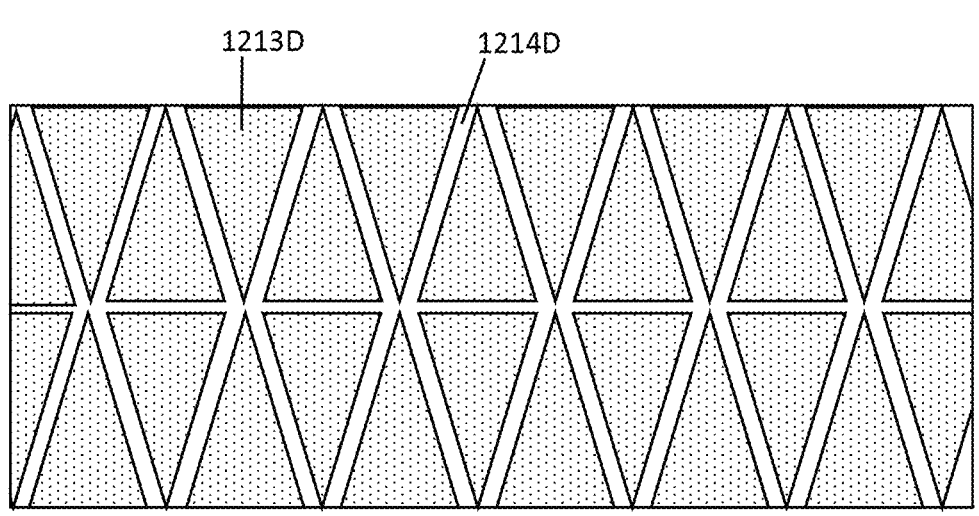

In FIG. 12D, anode 1200D includes patterned lithium storage structure 1212D having one or more first regions 1213D patterned as triangular islands separated by one or more second regions 1214D.

Figure 12E:
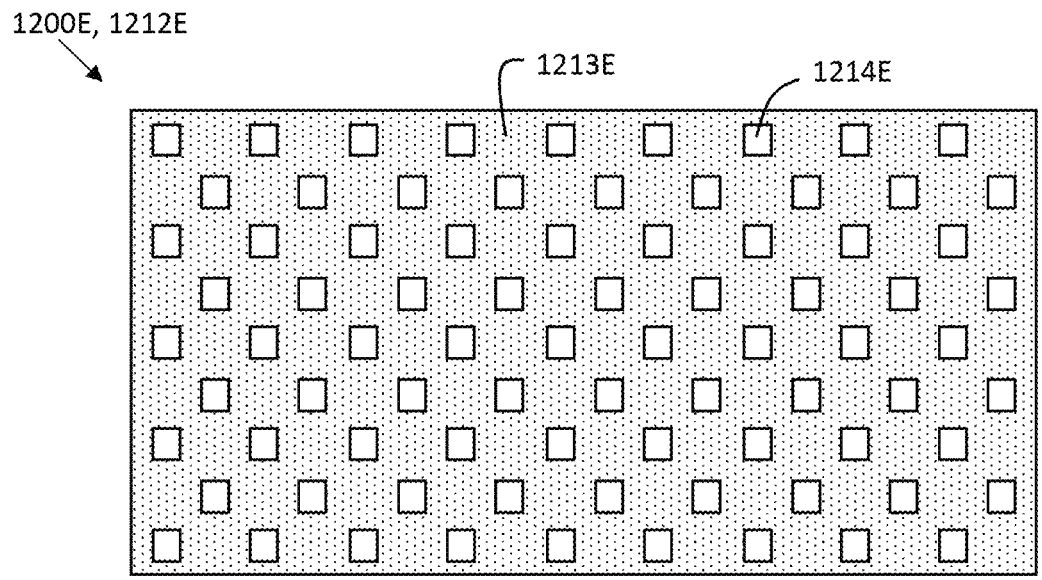

In FIG. 12E, anode 1200E includes patterned lithium storage structure 1212E having one or more first regions 1213E patterned with openings corresponding to one or more second regions 1214E.

Figure 12F:
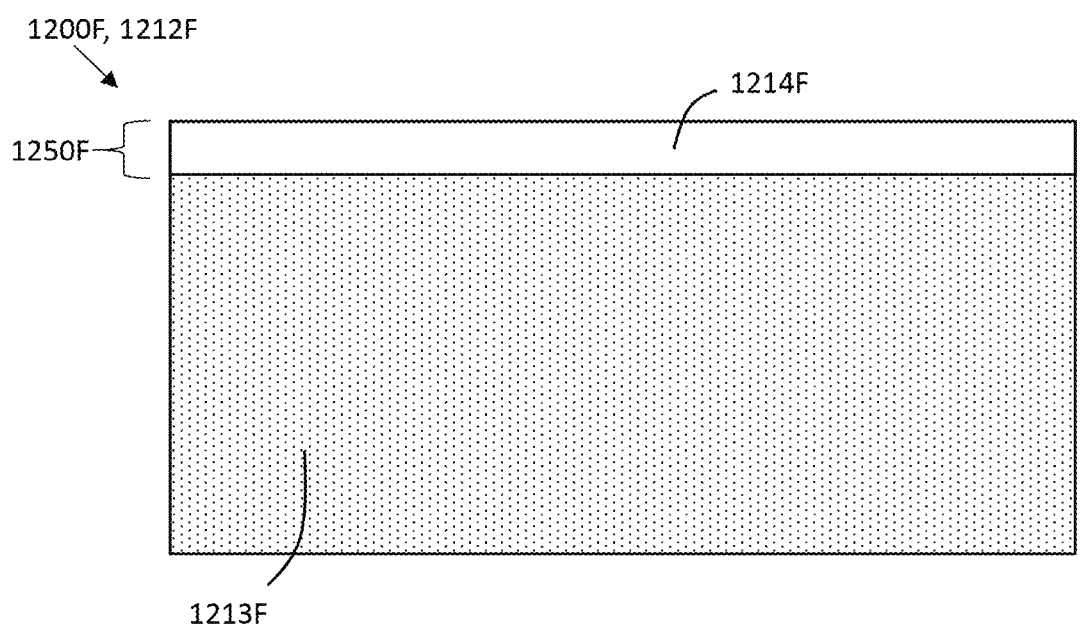

In FIG. 12F, anode 1200F includes patterned lithium storage structure 1212F having one or more first regions 1213F and one or more second regions 1214F in the form of contact pad region 1250F.

It should be noted that both sides of the current collector may optionally include a patterned lithium storage structure, and the two sides may have the same or a different pattern, e.g., to account for differences in stresses when winding. In some embodiments, one side of the current collector includes a patterned lithium storage structure and the other side includes a non-patterned lithium storage layer.

Patterning resolution, i.e., the minimum practical lateral dimension or feature width of the first or second region, may be a function of patterning method, the metal oxide layer thickness and target lithium storage layer thickness. In some embodiments, the feature width is at least 2 µm, alternatively at least 5 µm, alternatively at least 10 µm. In some embodiments, the feature width is in a range of 2 µm to 10 mm, alternatively 5 µm to 5 mm, alternatively 10 µm to 1 mm.

In some embodiments, the one or more first regions (e.g., 113) include substantially all of the anode's active lithium storage material in the form of continuous porous lithium storage layer (e.g., 107). Depending on the total capacity requirement of the battery, the total area of first region(s) (e.g., 113) relative to the total area of the second region(s) (e.g., 114) may be at least 1:1, alternatively at least 2:1, alternatively at least 3:1, alternatively at least 4:1, alternatively at least 5:1, alternatively at least 7:1, alternatively at least 10:1; alternatively at least 15:1, alternatively at least 20:1, alternatively at least 50:1. Higher ratios allow for increased charge capacity per unit area.

Figure 13A:
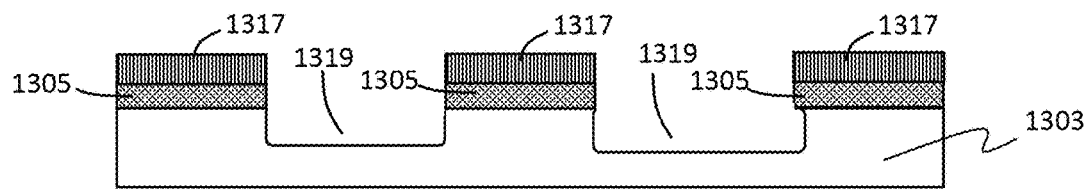
FIGS. 13A and 13B are cross-sectional views illustrating the formation of an anode having recessed portions in the metal layer according to some embodiments of the present disclosure.
Figure 13B:
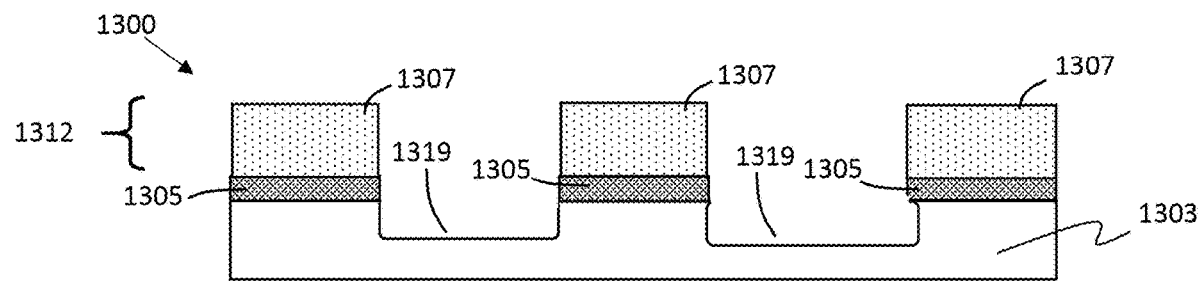

As mentioned, the one or more second regions (e.g., 114) or the second pattern (e.g., 109) may provide areas of stress relief when bending or winding the anode and/or contact areas for making electrical connection to the battery cell. However, the second regions/pattern may provide additional functionality or benefits to the anode. In some embodiments a surface portion of the second pattern may be etched, e.g., by electrochemical or chemical oxidation of the metal layer to form recessed portions in the metal layer. For example, FIG. 13A illustrates a structure analogous to that of FIG. 4D having resist material 1317 used to pattern metal oxide layer 1305 in a first pattern, but also having second pattern of recessed portions 1319 formed in metal layer 1303. In some embodiments, the resist material 1317 may protect the metal oxide layer 1305 from possible attack by chemical etching. This may be followed by removal of resist material 1317 and deposition of the continuous porous lithium storage layer 1307 as previously described to form the anode 1300 shown in FIG. 13B having patterned lithium storage structure 1312. The etched portion may allow for additional flexibility of the current collector and/or additional volume for other lithium storage materials, nanowires or functional compositions as discussed below.

Figure 14A:
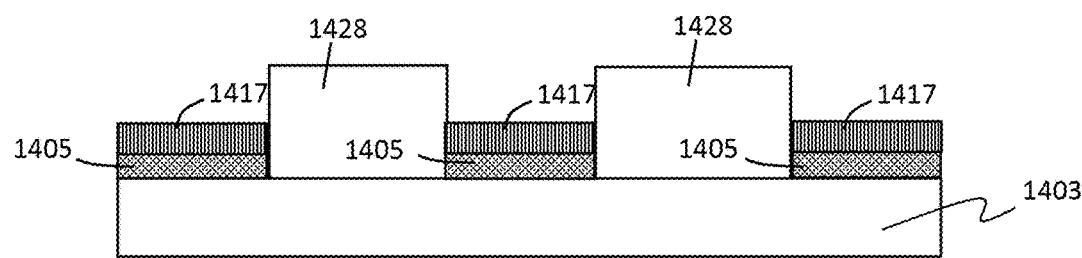
FIGS. 14A and 14B are cross-sectional views illustrating the formation of an anode having raised metal structures over the metal layer according to some embodiments of the present disclosure.
Figure 14B:
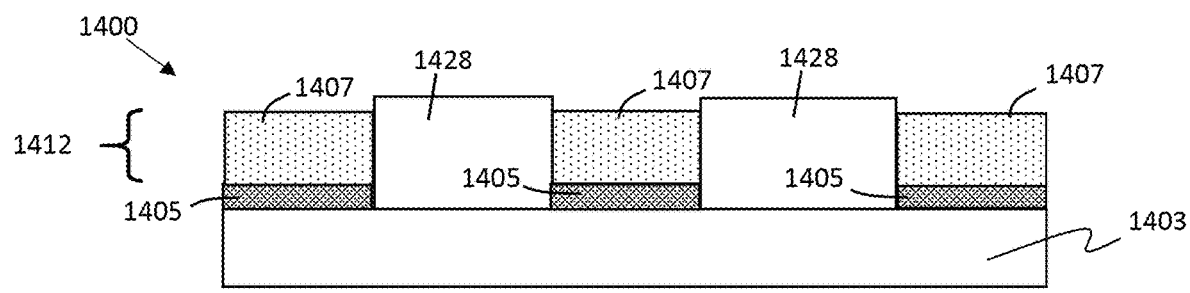

In some other embodiments, a metal may be electrolytically or electrolessly plated over the second pattern to form raised metal structures. For example, FIG. 14A illustrates a structure analogous to that of FIG. 4D or FIG. 5B having resist material 1417 used to pattern metal oxide layer 1405 in a first pattern, but also having second pattern of raised metal structures 1428 plated onto metal layer 1403. In some embodiments, the resist material 1417 may protect the metal oxide layer 1405 from unwanted plating. This may be followed by removal of resist material 1417 and deposition of the continuous porous lithium storage layer 1407 as previously described to form the anode shown 1400 in FIG. 14B having patterned lithium storage structure 1412. The metal of the raised metal structures may be the same or different than the metal of the metal layer. Such raised metal structures may act as lateral confinement barriers to limit lateral swell of the continuous porous lithium storage layer 1407. The raised metal structures may also act to improve electrical connectivity to the continuous porous lithium storage layer 1407.

Figure 15A:
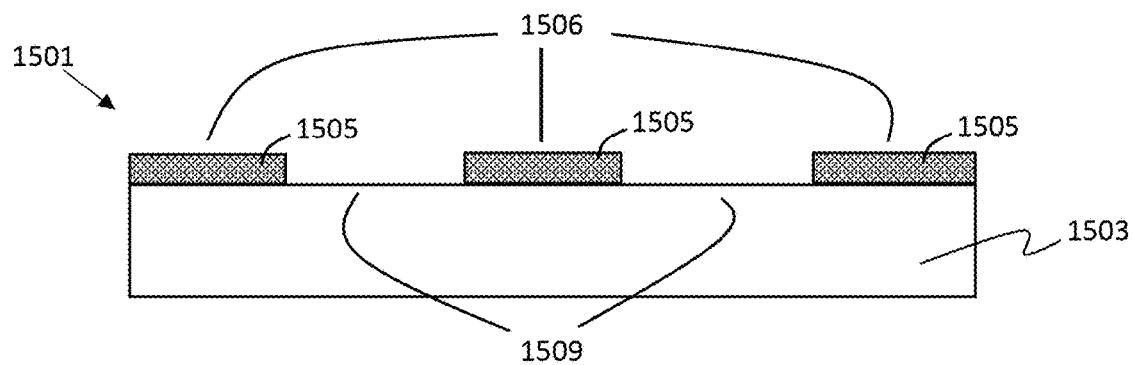
FIGS. 15A-15C are cross-sectional views illustrating the formation of a patterned lithium storage structure including lithium storage nanowires according to some embodiments of the present disclosure.
Figure 15B:
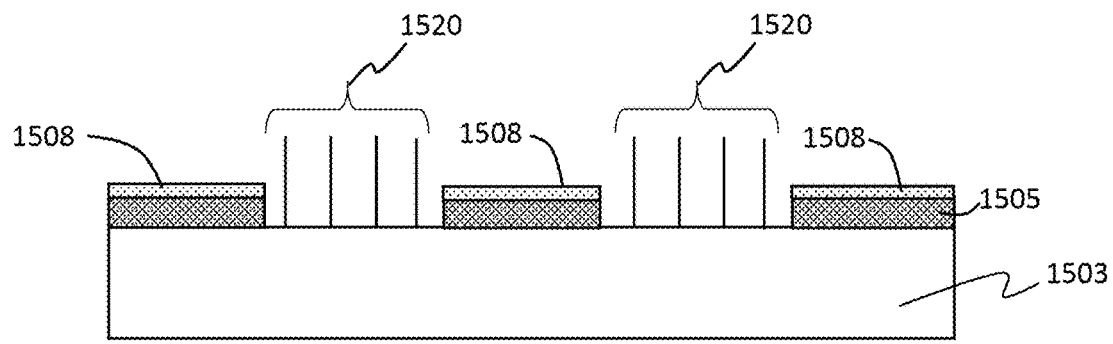
Figure 15C:
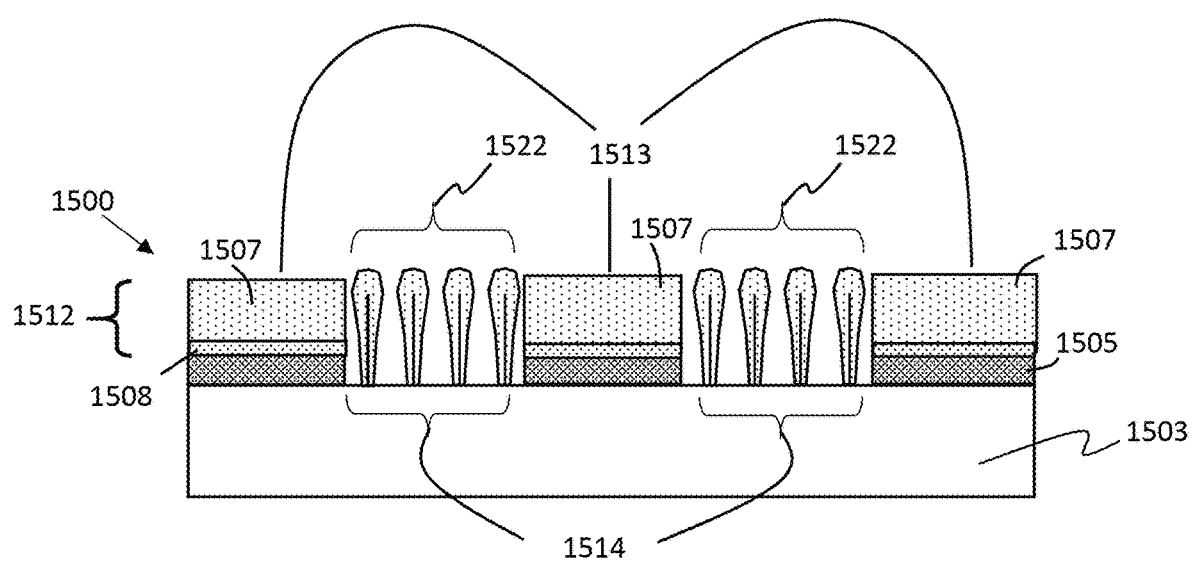

In some embodiments of the present disclosure, the second regions may include lithium storage nanostructures, e.g., nanowires, grown on the current collector in the second pattern not having the metal oxide layer. Methods of growing lithium storage nanowires are well known in the art, including but not limited to CVD and PECVD methods described in U.S. Pat. Nos. 9,325,014 and 8,257,866, the entire contents of which are incorporated by reference for all purposes. FIGS. 15A-15C show a method for forming a patterned lithium storage structure according to some embodiments of the present disclosure. In FIG. 15A, a current collector 1501 includes metal layer 1503, metal oxide layer 1505 formed in a first pattern 1506 over the metal layer and a complementary second pattern 1509 of areas not occupied by the first pattern of metal oxide. In some embodiments, electrically conducive metal layer 1503 may include nickel, e.g., as a metal foil or a metal layer over another metal or non-metallic layer. Heating the current collector, e.g., 450-550° C. in the presence of an appropriate precursor gas (e.g. silane) may cause catalyzed growth of alloyed nanowires 1520, e.g., nickel silicide alloy nanowires, over the second pattern 1509 but not over the metal oxide layer 1505, as shown in FIG. 15B. Instead of silane, germane or some other appropriate precursor gas may be used to form the alloyed nanowires. In some embodiments, some silicon, germanium or other material of the precursor gas may also deposit as a non-nanostructured layer 1508 over the patterned metal oxide layer during the growth of the alloyed nanowires. The non-nanostructured layer 1508 may also function as a lithium storage layer. In some embodiments, the non-nanostructured layer 1508 may be a continuous porous lithium storage layer. In some embodiments as shown in FIG. 15C, after growth of alloyed nanowires, the vapor deposition conditions (temperature, precursor gas, flow rates, pressure or other conditions) may be altered to lessen or stop alloyed nanowire formation and allow deposition of a lithium storage material (e.g. amorphous silicon) over both the one or more first regions 1513 to form of continuous porous lithium storage layer 1507 and over the alloyed nanowire structures of the second regions 1514 (e.g., in the form of lithium storage nanowires 1522). That is, in some embodiments, the patterned lithium storage structure 1512 includes one or more first regions of the continuous porous lithium storage layer 1507 (and optionally non-nanostructured layer 1508) and one or more second regions 1514 including lithium storage nanowires 1522). In some embodiments, the lithium storage material includes silicon, germanium or both. In some embodiments, the growth of alloyed nanowires is self-limiting, e.g., by limiting the amount nickel. In some embodiments, formation of the continuous porous lithium storage layer and lithium storage nanowires is performed in a common step and/or without breaking low pressure conditions of the vapor deposition chamber. In some embodiments, the alloyed nanowires are grown by CVD and the lithium storage material of the first and second regions is deposited by PECVD. In some embodiments, PECVD is used to grow the alloyed nanowires and deposit the lithium storage material of the first and second regions.

In some embodiments (not shown), most of the continuous porous lithium storage layer 1507 is deposited under a first set of conditions and then followed by a change in conditions to form alloyed nanowires, and optionally lithium storage nanowires, in the second region.

Prior art lithium storage nanowires may have certain disadvantages, one of which is physical robustness to handling (e.g. rubbing) causing nanowires to break off. On the other hand, nanowire structures may be more robust to bending stresses induced during winding than continuous layers of lithium storage material. According to some embodiments of the present disclosure, the first regions may help physically protect the nanowires in the second regions. By providing lithium storage nanowires in the one or more second region, the loss in surface area capacity caused by patterning the continuous porous lithium storage layer can be partially or entirely recovered. Further, the combination of two types of lithium storage structures may provide the anode with a broader range of charging and discharging capabilities and/or increased lifetime.

Figure 16A:
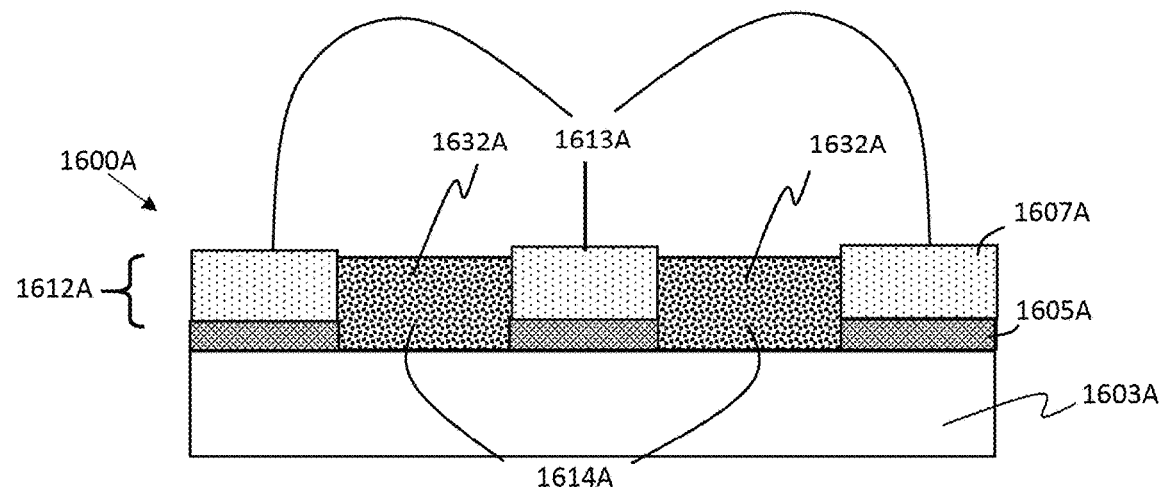
FIGS. 16A and 16B are cross-sectional views showing the patterned lithium storage structure and a functional composition according to some embodiments of the present disclosure.
Figure 16B:
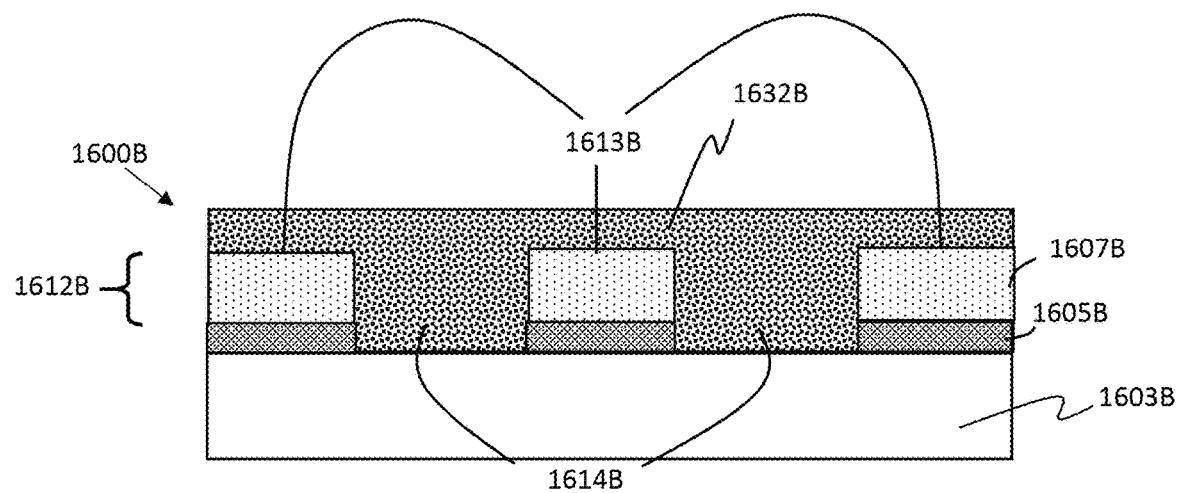

In some embodiments, the patterned lithium storage structure includes a functional composition in second regions deposited over the second pattern. As shown in FIG. 16A and FIG. 16B, an anode (1600A, 1600B) includes a patterned lithium storage structure (1612A, 1612B) including one or more first regions (1613A, 1613B) having a continuous porous lithium storage layer (1607A, 1607B) overlaying a first pattern of metal oxide layer (1605A, 1605B) which overlays metal layer (1603A, 1603B). In FIG. 16A, anode 1600A further includes functional composition 1632A deposited in one or more second regions 1614A corresponding to the second pattern of areas not occupied by the metal oxide or continuous porous lithium storage layer. FIG. 16B is similar except that functional composition 1632B is deposited in the one or more second regions 1614B and also over continuous porous lithium storage layer 1607B.

In some embodiments the functional composition may be deposited by wet coating or printing method, including but not limited to, screen printing, inkjet printing, gravure printing, offset printing, flexographic printing, curtain coating, spray coating, spin coating and slot die coating. For example, the functional composition may be coated over the entire anode and substantially removed from the top surface of the continuous porous lithium storage layer 1607A by a doctor blade or squeegee (FIG. 16A). In some embodiments, the functional material may be pattern-printed into the one or more second regions 1614A (FIG. 16A). In some embodiments, the functional composition is deposited and remains over both the second pattern and the continuous porous lithium storage layer 1607B (FIG. 16B).

In some embodiments, the functional composition may act as a supplemental active lithium storage layer for the anode and may be provided, for example, by coating a slurry containing an active lithium storage material (e.g., graphite or silicon-containing particles), a binder matrix and a solvent. Many other coatable, binder-based lithium storage layers are known in the art and may be used. Such binder-based lithium storage layers generally have lower areal lithium storage capacity than the continuous porous lithium storage layer. However, some may more easily withstand bending stresses during winding or the like and will at least partially offset the loss in surface area capacity caused by patterning the continuous porous lithium storage layer.

In some embodiments where the one or more second regions include active lithium storage materials, e.g., as lithium storage nanowires, a binder-based lithium storage material or the like, the ratio of the total area of first region(s) of continuous porous lithium storage layer (e.g., 1513, 1613A, 1613B) relative to the total area of the second region(s) (e.g., 1514, 1614A, 1614B) may be in range of 50:1 to 20:1, alternatively 20:1 to 10:1, alternatively 10:1 to 5:1, alternatively 5:1 to 2:1, alternatively 2:1 to 1:1, alternatively 1:1 to 1:2, alternatively 1:2 to 1:5, alternatively 1:5 to 1:10, alternatively 1:10 to 1:20, alternatively 1:20 to 1:50, or any combination of contiguous ranges thereof.

In some embodiments, the functional composition includes a polymer comprising a source of lithium ion, e.g., as lithium sulfonate or lithium carboxylate groups or the like. This may be used to supplement the lithium ion present in the electrolyte and reduce possible lithium ion starvation effects due to irreversible losses of lithium in the anode over time. In some embodiments, the functional composition may act to partially confine expansion of the continuous porous lithium storage layer (1607A, 1607B) that may occur during lithiation. Such confinement may help increase lifetime. In some embodiments, the expansion confinement composition may include a polymer or a mixture of a polymer and inorganic particles. In some embodiments, the expansion confinement primarily directed to a lateral expansion (as in FIG. 16A). In some embodiments where the functional composition also overcoats the continuous porous lithium storage layer, the expansion confinement may act on the entire continuous porous lithium storage layer (1607A, 1607B) as in FIG. 16B. In some embodiments the functional composition includes a material that strongly binds to the second pattern of exposed metal layer (not having the metal oxide layer 1605A, 1605B) thereby creating a strong anchor to hold the continuous porous lithium storage layer (1607A, 1607B) in place. In some embodiments the confining functional composition has some stretchability (e.g., it may include a stretchable polymer such as a polysiloxane) to allow limited expansion of the continuous porous lithium storage layer.

In some embodiments, the functional composition (1632A, 1632B) may include an electrically conductive material, e.g., silver (or other metal) nanowires, metallic particles, a conductive polymer, a conductive metal oxide, carbon nanofibers, carbon nanotubes, or a combination. In some embodiments, the presence of such electrically conductive materials may help enable electrical continuity of the anode after electrochemical cycling and some possible breakdown of the continuous porous lithium storage layer structure. In some embodiments the functional composition may include an electrically conductive material mentioned above, but the conductive materials are sufficiently dilute in a binder or matrix so that the functional composition itself does not readily conduct electrical current at normal battery operating voltages.

In some embodiments, functional composition (1632A, 1632B) may be conductive to lithium ions. In the case where the functional composition 1632B is over continuous porous lithium storage layer 1607B (FIG. 16B), the functional composition should generally have some lithium ion conductivity, e.g., is at least $10^{-9}$ S/cm, alternatively at least $10^{-8}$ S/cm, alternatively at least $10^{-7}$ S/cm, alternatively at least $10^{-6}$ S/cm.

In some embodiments, the functional composition may include any combination of materials or functions described above.

In some embodiments, the second region may include lithium storage nanowires grown on the current collector and one or more functional composition according to any of the embodiments described above.

The anode may optionally include various additional layers and features. The current collector may include one or more features to ensure that a reliable electrical connection can be made in the energy storage device. In some embodiments, a supplemental layer is provided over the patterned lithium storage structure. In some embodiments, the supplemental layer is a protection layer to enhance lifetime or physical durability. The supplemental layer may be an oxide formed from the lithium storage material itself, e.g., silicon dioxide in the case of silicon, or some other suitable material. A supplemental layer may be deposited, for example, by ALD, CVD, PECVD, evaporation, sputtering, solution coating, ink jet or any method that is compatible with the anode. In some embodiments the supplemental layer may conformally coat the patterned lithium storage structure. In some embodiments, the top surface of the supplemental layer corresponds to a top surface of the anode.

A supplemental layer should be reasonably conductive to lithium ions and permit lithium ions to move into and out of the patterned lithium storage structure during charging and discharging. In some embodiments, the lithium ion conductivity of a supplemental layer is at least $10^{-9}$ S/cm, alternatively at least $10^{-8}$ S/cm, alternatively at least $10^{-7}$ S/cm, alternatively at least $10'$ S/cm. In some embodiments, the supplemental layer acts as a solid-state electrolyte.

Some non-limiting examples of materials used in a supplemental layer include metal oxides, nitrides, or oxynitrides, e.g., those containing aluminum, titanium, vanadium, zirconium or tin, or mixtures thereof. The metal oxide, metal nitride or metal oxynitride may include other components such as phosphorous or silicon. The supplemental layer may include a lithium-containing material such as lithium phosphorous oxynitride (LIPON), lithium phosphate, lithium aluminum oxide, $(Li,La)_xTi_yO_z$, or $Li_xSi_yAl_2O_3$. In some embodiments, the supplemental layer includes a metal oxide, metal nitride, or metal oxynitride, and has an average thickness of less than about 100 nm, for example, in a range of about 0.1 to about 10 nm, or alternatively in a range of about 0.2 nm to about 5 nm. LIPON or other solid-state electrolyte materials having superior lithium transport properties may have a thickness of more than 100 nm, but may alternatively, be in a range of about 1 to about 50 nm.

In some embodiments the anode is at least partially prelithiated, i.e., the patterned lithium storage structure and/or the metal oxide layer includes some lithium prior to battery assembly.

Battery Features

The preceding description relates primarily to the anode/negative electrode of a lithium-ion battery (LIB). The LIB typically includes a cathode/positive electrode, an electrolyte and a separator (if not using a solid-state electrolyte). As is well known, batteries can be formed into multilayer stacks of anodes and cathodes with an intervening separator. Alternatively, anode/cathode stacks can be formed into a so-called jelly-roll. Such structures are provided into an appropriate housing having desired electrical contacts.

Cathode

Positive electrode (cathode) materials include, but are not limited to, lithium metal oxides or compounds (e.g., $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$), carbon fluoride, metal fluorides such as iron fluoride ($FeF_3$), metal oxide, sulfur, selenium and combinations thereof. Cathode active materials are typically provided on, or in electrical communication with, an electrically conductive cathode current collector.

Current Separator The current separator allows ions to flow between the anode and cathode but prevents direct electrical contact. Such separators are typically porous sheets. Non-aqueous lithium-ion separators are single layer or multilayer polymer sheets, typically made of polyolefins, especially for small batteries. Most commonly, these are based on polyethylene or polypropylene, but polyethylene terephthalate (PET) and polyvinylidene fluoride (PVdF) can also be used. For example, a separator can have >30% porosity, low ionic resistivity, a thickness of ~10 to 50 μm and high bulk puncture strengths. Separators may alternatively include glass materials, ceramic materials, a ceramic material embedded in a polymer, a polymer coated with a ceramic, or some other composite or multilayer structure, e.g., to provide higher mechanical and thermal stability.

Electrolyte

The electrolyte in lithium ion cells may be a liquid, a solid, or a gel. A typical liquid electrolyte comprises one or more solvents and one or more salts, at least one of which includes lithium. During the first few charge cycles (sometimes referred to as formation cycles), the organic solvent and/or the electrolyte may partially decompose on the negative electrode surface to form an SEI (Solid-Electrolyte-Interphase) layer. The SEI is generally electrically insulating but ionically conductive, thereby allowing lithium ions to pass through. The SEI may lessen decomposition of the electrolyte in the later charging cycles.

Some non-limiting examples of non-aqueous solvents suitable for some lithium ion cells include the following: cyclic carbonates (e.g., ethylene carbonate (EC), fluoroethylene carbonate (FEC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC, also commonly abbreviated EMC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitriles (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), organic compounds containing an S=O group (e.g., dimethyl sulfone and divinyl sulfone), and combinations thereof.

Non-aqueous liquid solvents can be employed in combination. Examples of these combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In some embodiments, a cyclic carbonate may be combined with a linear ester. Moreover, a cyclic carbonate may be combined with a lactone and a linear ester. In some embodiments, the weight ratio, or alternatively the volume ratio, of a cyclic carbonate to a linear ester is in a range of 1:9 to 10:1, alternatively 2:8 to 7:3.

A salt for liquid electrolytes may include one or more of the following non-limiting examples: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)$ $_{2x}$Li), and combinations thereof. Common combinations include: LiPF$_6$ and LiBF$_4$; LiPF$_6$ and LiN(CF$_3$SO$_2$)$_2$; and LiBF$_4$ and LiN(CF$_3$SO$_2$)$_2$.

In some embodiments, the total concentration of salt in a liquid non-aqueous solvent (or combination of solvents) is at least 0.3 M, alternatively at least 0.7M. The upper concentration limit may be driven by a solubility limit and operational temperature range. In some embodiments, the concentration of salt is no greater than about 2.5 M, alternatively no more than about 1.5 M.

In some embodiments, the battery electrolyte includes a non-aqueous ionic liquid and a lithium salt.

A solid electrolyte may be used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as polyvinylidene fluoride (PVDF) or chloride or copolymer of their derivatives, poly(chlorotrifluoroethylene), poly(ethylene-chlorotrifluoro-ethylene), or poly(fluorinated ethylene-propylene), polyethylene oxide (PEO) and oxymethylene linked PEO, PEO-PPO-PEO crosslinked with trifunctional urethane, poly(bis(methoxy-ethoxy-ethoxide))-phosphazene (MEEP), triol-type PEO crosslinked with difunctional urethane, poly((oligo)oxyethylene)methacrylate-co-alkali metal methacrylate, polyacrylonitrile (PAN), polymethylmethacrylate (PMMA), polymethylacrylonitrile (PMAN), polysiloxanes and their copolymers and derivatives, acrylate-based polymer, other similar solvent-free polymers, combinations of the foregoing polymers either condensed or cross-linked to form a different polymer, and physical mixtures of any of the foregoing polymers. Other less conductive polymers that may be used in combination with the above polymers to improve the strength of thin laminates include: polyester (PET), polypropylene (PP), polyethylene naphthalate (PEN), polyvinylidene fluoride (PVDF), polycarbonate (PC), polyphenylene sulfide (PPS), and polytetrafluoroethylene (PTFE). Such solid polymer electrolytes may further include a small amount of organic solvents listed above. The polymer electrolyte may be an ionic liquid polymer. Such polymer-based electrolytes can be coated using any number of conventional methods such as curtain coating, slot coating, spin coating, inkjet coating, spray coating or other suitable method.

Additives may be included in the electrolyte to serve various functions. For example, additives such as polymerizable compounds having an unsaturated double bond may be added to stabilize or modify the SEI. Certain amines or borate compounds can act as cathode protection agents. Lewis acids can be added to stabilize fluorine-containing anion such as PF$_6$. Safety protection agents include those to protect overcharge, e.g., anisoles, or act as fire retardants, e.g., alkyl phosphates.

In some embodiments, the original, non-cycled anode may undergo structural or chemical changes during electrochemical charging/discharging, for example, from normal battery usage or from an earlier "electrochemical formation step". As is known in the art, an electrochemical formation step is commonly used to form an initial SEI layer and involves relatively gentle conditions of low current and limited voltages. The modified anode prepared in part from such electrochemical charging/discharging cycles may still have excellent performance properties, despite such structural and/or chemical changes relative to the original, non-cycled anode

EXAMPLES

Current Collector 1 (with Metal Oxide Layer)

Current collectors having a metal oxide layer (a nickel oxide) over an electrically conductive metal layer (nickel) were prepared by placing nickel foil in a muffle furnace (heated air) and holding the foil at 700° C. for 30 minutes then cooled to room temperature. The metal oxide thickness was approximately 0.7 to 1.2 microns. Although not patterned, Current Collector 1 is representative of some embodiments of the present disclosure having a first pattern of metal oxide layer.

Current Collector 2 (No Metal Oxide Layer)

The same kind of nickel foil as used for Current Collector 1 was simply cleaned with an IPA wipe and not subjected to any oxidation treatments. Although not patterned, Current Collector 2 is representative of some embodiments of the present disclosure having a second pattern of areas not occupied by the metal oxide.

Example 1

Anode 1A

Current Collector 1 was placed in a high-density plasma-enhanced chemical vapor deposition tool (HDPECVD) and exposed to silane gas at 180° C. for 60 minutes. A continuous porous lithium storage layer formed at a loading of about 0.7 mg/cm' of active silicon. When tested in a half cell, Anode 1A was found to have good cycle life and lithium storage capacity.

Anode 1B

Current Collector 2 was placed in a high-density plasma-enhanced chemical vapor deposition tool (HDPECVD) and an attempt was made to deposit amorphous silicon using the same conditions as in Anode 1A but for 40 minutes. However, no adherent layer of silicon formed on Current Collector 2 under these conditions. Some poorly adhered, dusty silicon deposit was easily brushed off. No electrochemical testing was conducted.

Taken together, Anode 1A and 1B show that anodes according to certain embodiments of the present disclosure having patterned lithium storage structures may be readily prepared. Anode 1A shows that a continuous lithium storage layer can be deposited on a metal oxide layer and result in an anode with good cycle life and lithium storage capacity. Anode 2A shows that an amorphous silicon layer does not deposit on a metal layer. As a result, a continuous porous lithium storage layer would not deposit on the metal. Hence, embodiments having a first pattern of a metal oxide layer and a continuous porous lithium storage layer and a second pattern of areas not occupied by the metal oxide or the continuous porous lithium storage layer can be formed.

Example 2

Silicon was concurrently deposited over Current Collector 1 and Current Collector 2 using expanding thermal PECVD to form corresponding Anode 2A (from Current Collector 1) and Anode 2B (from Current Collector 2). The formation gases were silane at about 0.20 slm (standard liters per minute) and hydrogen at about 0.20 slm, along with an argon carrier gas at about 2 slm. The process pressure was about 0.145 mbar. For at least a portion of the deposition, the temperature was higher than that for Example 1 (about 450 to 550° C.).

Characterization

ICP-AES analysis showed Anode 2A had about 1.2 mg/cm' of total silicon and Anode 2B had about 2.4 mg/cm' of total silicon. In the case of Anode 2B, some of this silicon was in the form of nickel silicide, which has lower lithium storage capacity than amorphous silicon.

Figure 17A:
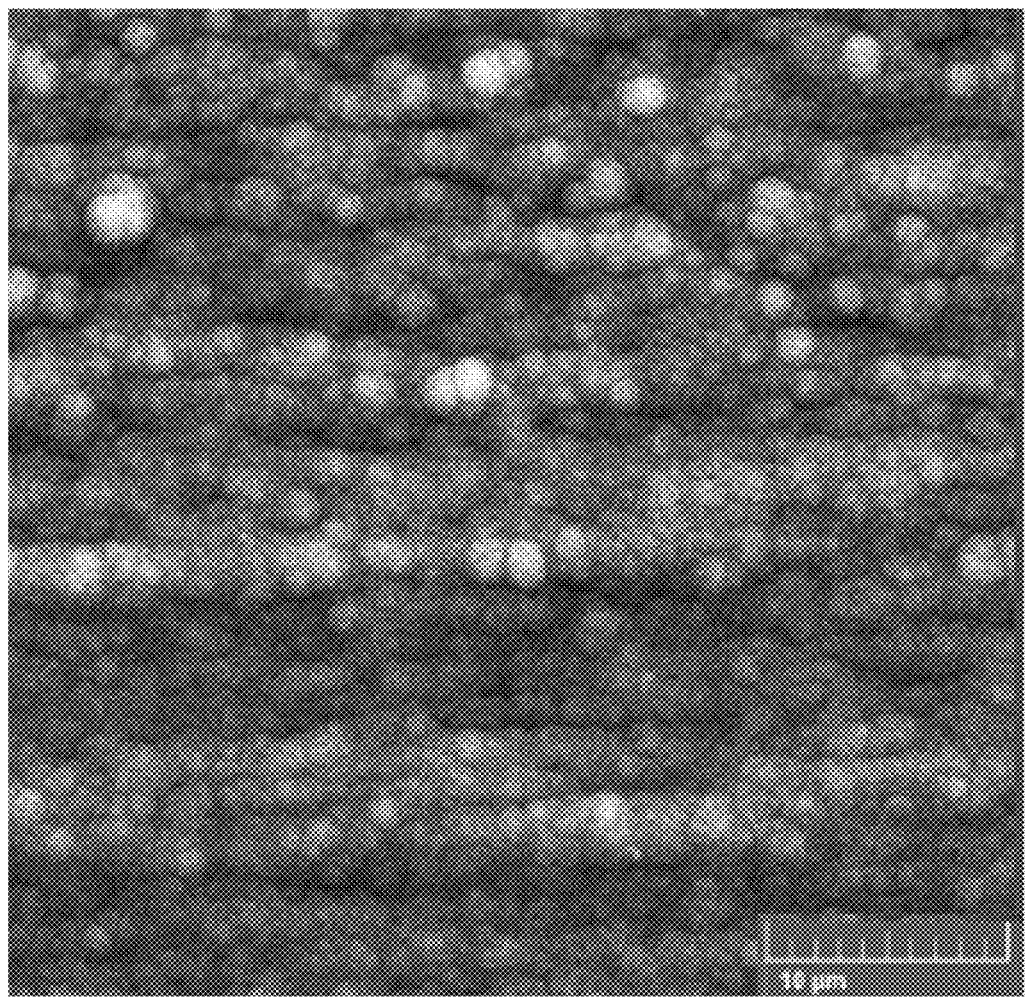
FIG. 17A is a top-view SEM of Anode 2A having a continuous porous lithium storage layer according to an embodiment of the present disclosure.
Figure 17B:
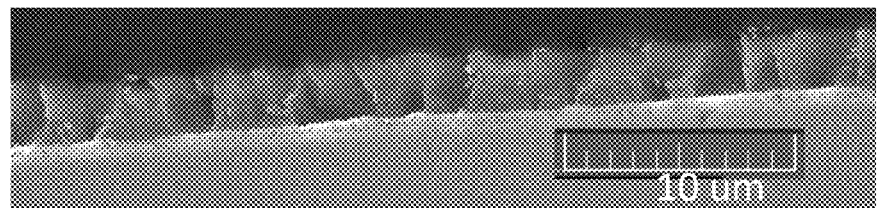
FIG. 17B is a cross-sectional SEM of the anode of FIG. 17A according to an embodiment of the present disclosure.
Figure 18:
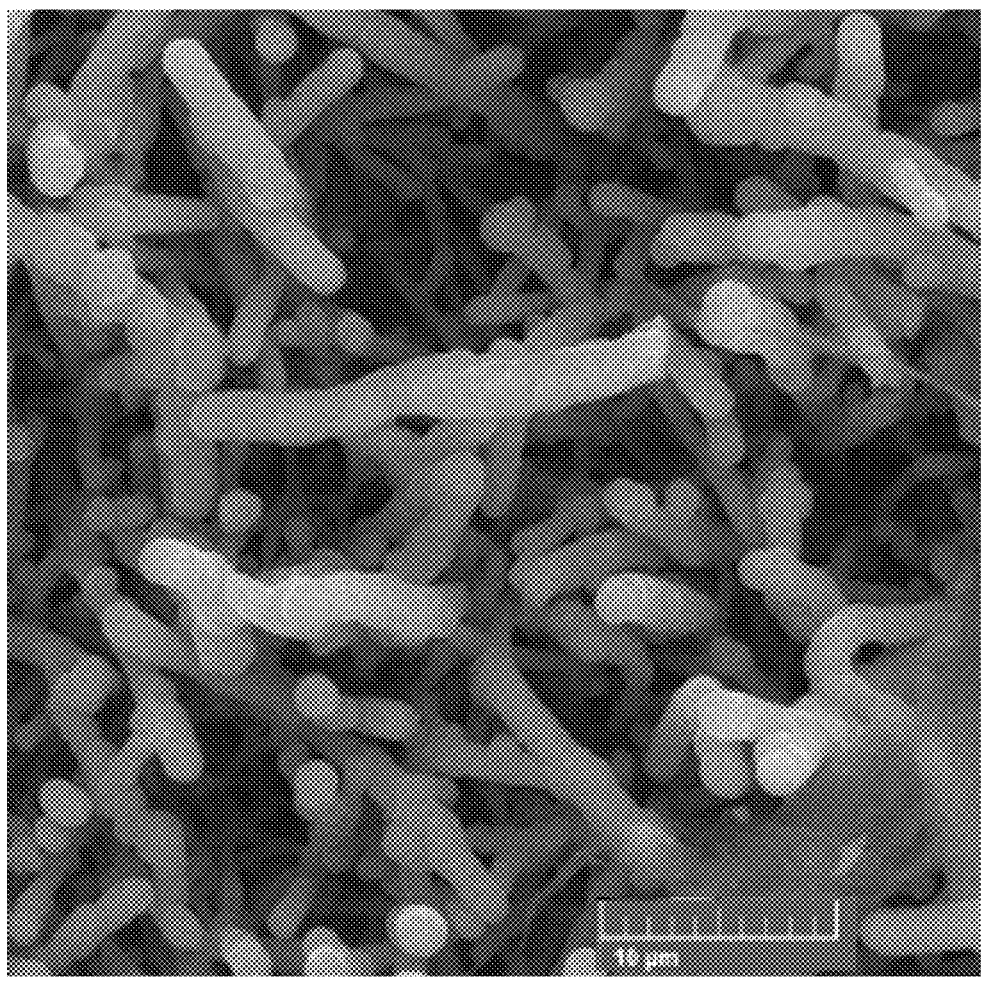
FIG. 18 is a top-view SEM of Anode 2B having lithium storage nanowires according to an embodiment of the present disclosure.

Anode 2A had a silvery, metallic appearance, although not mirror-like. In contrast, Anode 2B had a black appearance. Microstructure differences between the anodes are readily apparent as shown in FIGS. 17-18. FIG. 17A is an SEM top view of Anode 2A, and for reference, 17B is an SEM cross-sectional view of Anode 2A. Anode 2A includes a porous continuous lithium storage layer. Other analyses showed that this layer includes primarily amorphous silicon. FIG. 18 is an SEM top view of Anode 2B showing the lithium storage filamentary structures (e.g., nanowires) that formed. Other analyses showed that the Anode 2B structures included nickel silicides and amorphous silicon.

When tested in half cells, both anodes showed good cycle life and lithium storage capacity.

Taken together, Anode 2A and Anode 2B show that anodes according to certain embodiments of the present disclosure that include patterned lithium storage structures having both continuous porous lithium storage layers and lithium storage nanowires may be readily prepared.

Although the present anodes have been discussed with reference to batteries, in some embodiments the present anodes may be used in hybrid lithium ion capacitor devices. Below are some non-limiting embodiments:

1. An anode for an energy storage device, the anode comprising:
   a) a current collector comprising:
      i) a metal layer; and
      ii) a metal oxide layer provided in a first pattern overlaying the metal layer; and
   b) a patterned lithium storage structure comprising a continuous porous lithium storage layer selectively overlaying at least a portion of the first pattern of metal oxide.

2. The anode of embodiment 1 wherein the continuous porous lithium storage layer has a total content of silicon, germanium, or a combination thereof, of at least 40 atomic %.

3. The anode of embodiment 1 or 2 wherein the continuous porous lithium storage layer includes less than 10 atomic % carbon.

4. The anode according to any of embodiments 1-3, wherein the continuous porous lithium storage layer is substantially free of nanostructures.

5. The anode according to any of embodiments 1-4, wherein the metal layer comprises stainless steel, titanium, nickel, or copper, or a combination thereof.

6. The anode according to any of embodiments 1-5 wherein the metal oxide layer comprises an oxide of nickel, an oxide of copper, an oxide of titanium, or a combination thereof.

7. The anode according to any of embodiments 1-6, wherein the metal oxide layer has an average thickness of at least 0.02 μm.

8. The anode according to any of embodiments 1-7, wherein the continuous porous lithium storage layer comprises amorphous silicon having an active areal density of at least 0.2 mg/cm' and the total content of silicon is at least 40 atomic %.

9. The anode according to any of embodiments 1-8, wherein the continuous porous lithium storage layer has an average thickness from about 0.5 μm to about 40 μm.

10. The anode according to any of embodiments 1-9, wherein the continuous porous lithium storage layer has an average density from about 1.1 g/cm³ to about 2.25 g/cm³ and comprises at least 40 atomic % amorphous silicon.

11. The anode according to any of embodiments 1-10 further comprising lithium storage nanowires overlaying the metal layer in one or more areas not occupied by the first pattern of metal oxide.

12. The anode of embodiment 11 wherein the lithium storage nanowires comprise a metal silicide and amorphous silicon.

13. The anode according to any of embodiments 1-12 further comprising a functional composition overlaying the metal layer in one or more areas not occupied by the first pattern of metal oxide.

14. The anode of embodiment 13 wherein the functional composition further overlays the continuous porous lithium storage layer.

15. The anode according to embodiment 13 or 14 wherein the functional composition comprises a supplemental lithium storage material.

16. The anode according to embodiment 15 wherein the supplemental lithium storage material comprises silicon-containing particles in a binder matrix.

17. The anode according to any of embodiments 13-16, wherein the functional composition comprises a source of lithium ion.

18. The anode according to any of embodiments 13-17, wherein the functional composition comprises an expansion confinement composition.

19. The anode according to any of embodiments 13-18, wherein the functional composition comprises an electrically conductive material.

20. The anode of embodiment 19 wherein the conductive material includes metal nanowires, metal particles, a conductive polymer, a conductive metal oxide, or combinations thereof.

21. A battery comprising the anode according to any of embodiments 1-20.

22. A method of making an anode for use in an energy storage device, the method comprising:
   providing a current collector comprising a metal layer and a metal oxide layer provided in a first pattern overlaying the metal layer; and
   selectively forming by chemical vapor deposition, a continuous porous lithium storage layer overlaying the first pattern of metal oxide, wherein the chemical vapor deposition includes exposing the current collector to at least one lithium storage material precursor gas.

23. The method of embodiment 22 wherein the lithium storage material precursor gas comprises silane or germane, and the continuous porous lithium storage layer has a total content of silicon, germanium or a combination thereof of at least 40 atomic %.

24. The method of embodiment 22 or 23, wherein the metal layer comprises stainless steel, titanium, nickel, or copper, or a combination thereof.

25. The method according to any of embodiments 22-24, wherein the first metal oxide layer comprises an oxide of nickel, an oxide of copper, an oxide of titanium, or a combination thereof.

26. The anode according to any of embodiments 22-25, wherein the first metal oxide layer has an average thickness of at least 0.02 μm.

27. The method according to any of embodiments 22-26 further comprising forming by chemical vapor deposition, lithium storage nanowires over the metal layer in one or more areas not occupied by the first pattern of metal oxide.

28. The method of embodiment 27 wherein the lithium storage nanowires comprise a metal silicide and amorphous silicon.

29. The method of embodiment 27 or 28 wherein the lithium storage nanowires are formed in a common step with formation of the continuous porous lithium storage layer.

30. The method according to any of embodiments 22-29 further comprising depositing a functional composition over the metal layer in one or more areas not occupied by the first pattern of metal oxide.

31. The method of embodiment 30 wherein the functional composition is further deposited over the continuous porous lithium storage layer.

32. The method of embodiment 30 or 31 wherein the functional composition is deposited by screen printing, inkjet printing, gravure printing, offset printing, flexographic printing, curtain coating, spray coating, spin coating, or slot die coating.

33. The method according to any of embodiments 30-32, wherein the functional composition comprises a supplemental lithium storage material.

34. The method of embodiment 33 wherein the supplemental lithium storage material comprises silicon-containing particles in a binder matrix.

35. The method according to any of embodiments 32-34, wherein the functional composition comprises a source of lithium ion.

36. The method according to any of embodiments 32-35, wherein the functional composition comprises an expansion confinement composition.

37. The method according to any of embodiments 32-36, wherein the functional composition comprises an electrically conductive material.

38. The method of embodiment 37 wherein the conductive material includes metal nanowires, metal particles, a conductive polymer, a conductive metal oxide, or combinations thereof.

39. The method according to any of embodiments 22-38 further comprising:
providing an electrically conductive current collector precursor comprising a metal layer; and
forming the first pattern of a first metal oxide layer overlaying the metal layer, thereby forming the current collector.

40. The method of embodiment 39, wherein forming the first pattern of a metal oxide comprises oxidation of a surface portion of the metal layer.

41. The method of embodiment 40 further comprising: i) forming a patterned resist over a non-patterned metal oxide; ii) etching or dissolving areas of metal oxide not covered by the patterned resist; and iii) and removing the patterned resist.

42. The method of embodiment 40 further comprising applying a pattern of an oxidation resistant material prior to oxidation.

43. The method of embodiment 39, wherein forming the first pattern of metal oxide comprises depositing a metal oxide or metal oxide precursor over the current collector precursor.

44. The method of embodiment 43 further comprising depositing vaporized metal oxide through a shadow mask.

45. The method of embodiment 43 further comprising printing the metal oxide precursor over the current collector precursor and treating the printed metal oxide precursor to form the first pattern of metal oxide.

46. The method of embodiment 43 further comprising: i) forming a patterned resist over a non-patterned metal oxide; ii) etching or dissolving areas of the metal oxide not covered by the patterned resist; and iii) and removing the patterned resist.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the anode" includes reference to one or more anodes and equivalents thereof known to those skilled in the art, and so forth. The invention has now been described in detail for the purposes of clarity and understanding. However, it will be appreciated that certain changes and modifications may be practice within the scope of the appended claims.

All publications, patents, and patent applications cited herein are hereby incorporated by reference in their entirety for all purposes. None is admitted to be prior art.

We claim:

1. A lithium-ion battery comprising:
a) a cathode;
b) an anode comprising:

i) current collector comprising a metal oxide layer provided in a first pattern overlaying a metal layer; and ii) a patterned lithium storage structure comprising a continuous porous lithium storage layer overlaying at least a portion of the first pattern of metal oxide; and c) a polymer electrolyte.

2. The lithium-ion battery of claim 1, wherein the polymer electrolyte comprises a polyvinylidene fluoride.

3. The lithium-ion battery of claim 1, wherein the polymer electrolyte comprises a polyethylene oxide.

4. The lithium-ion battery of claim 1, wherein the polymer electrolyte comprises poly(bis(methoxy-ethoxy-ethoxide))-phosphazene.

5. The lithium-ion battery of claim 1, wherein the polymer electrolyte comprises poly((oligo)oxyethylene) methacrylate-co-alkali metal methacrylate.

6. The lithium-ion battery of claim 1, wherein the polymer electrolyte comprises polyacrylonitrile, polymethylmethacrylate, or polymethylacrylonitrile.

7. The lithium-ion battery of claim 1, wherein the polymer electrolyte comprises a polysiloxane.

8. The lithium-ion battery of claim 1, wherein the polymer electrolyte comprises an acrylate-based polymer.

9. The lithium-ion battery of claim 1, wherein the polymer electrolyte comprises a solvent-free polymer.

10. The lithium-ion battery of claim 1, wherein the polymer electrolyte comprises an ionic liquid polymer.

11. The lithium-ion battery of claim 1, wherein the polymer electrolyte comprises an organic solvent.

12. The lithium-ion battery of claim 1, wherein the cathode comprises $LiCoO_2$, $LiFePO_4$, $LiMnO_2$, $LiNiO_2$, $LiMn_2O_4$, $LiCoPO_4$, $LiNi_xCo_yMn_zO_2$, $LiNi_xCo_yAl_zO_2$, $LiFe_2(SO_4)_3$, or $Li_2FeSiO_4$.

13. The lithium-ion battery of claim 1, wherein the cathode comprises selenium or sulfur.

14. The lithium-ion battery of claim 1, wherein the continuous porous lithium storage layer has a total content of silicon, germanium, or a combination thereof, of at least 40 atomic %.

15. The lithium-ion battery of claim 1, wherein the continuous porous lithium storage layer comprises amorphous silicon having an active areal density of at least 0.2 mg/cm$^2$ and the total content of silicon is at least 85 atomic %.

16. The lithium-ion battery of claim 1, further comprising lithium storage nanowires overlaying the metal layer in one or more areas not occupied by the first pattern of metal oxide.

17. The lithium-ion battery of claim 16, wherein the lithium storage nanowires comprise a metal silicide and amorphous silicon.

18. The lithium-ion battery of claim 1 wherein the continuous porous lithium storage layer includes less than 10 atomic % carbon.

19. The lithium-ion battery of claim 1, wherein the continuous porous lithium storage layer is substantially free of nanostructures.

20. The lithium-ion battery of claim 1, wherein the metal layer comprises stainless steel, titanium, nickel, copper, or a combination thereof.

* * * * *